United States Patent
Chandramouli et al.

(10) Patent No.: US 10,021,533 B2
(45) Date of Patent: Jul. 10, 2018

(54) GROUP MESSAGING IN A COMMUNICATION NETWORK

(71) Applicants: NOKIA SOLUTIONS AND NETWORKS OY, Espoo (FI); Devaki Chandramouli, Plano, TX (US); Rainer Liebhart, Munich (DE)

(72) Inventors: Devaki Chandramouli, Plano, TX (US); Rainer Liebhart, Munich (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/430,691

(22) PCT Filed: Sep. 24, 2012

(86) PCT No.: PCT/US2012/056869
§ 371 (c)(1),
(2) Date: Mar. 24, 2015

(87) PCT Pub. No.: WO2014/046686
PCT Pub. Date: Mar. 27, 2014

(65) Prior Publication Data
US 2015/0230063 A1    Aug. 13, 2015

(51) Int. Cl.
*H04W 4/00*    (2018.01)
*H04W 4/06*    (2009.01)
(Continued)

(52) U.S. Cl.
CPC ............. *H04W 4/06* (2013.01); *H04L 12/189* (2013.01); *H04L 12/1845* (2013.01);
(Continued)

(58) Field of Classification Search
None
See application file for complete search history.

(56) References Cited

U.S. PATENT DOCUMENTS 7,023,813 B2    4/2006    Newberg et al.
7,366,780 B2    4/2008    Keller et al.
(Continued)

FOREIGN PATENT DOCUMENTS

EP    2 456 237 A1    5/2012
EP    2 566 200 A1    3/2013
WO    2011/134394 A1    11/2011

OTHER PUBLICATIONS

International Search Report and Written Opinion dated Dec. 21, 2012 corresponding to International Patent Application No. PCT/US2012/056869.
(Continued)

*Primary Examiner* — Shantell L Heiber
(74) *Attorney, Agent, or Firm* — Squire Patton Boggs (US) LLP

(57) ABSTRACT

An apparatus of a communication network performs processing (10) for a group message to be sent to a plurality of devices. The group message includes an application layer content and a group identification identifying the plurality of devices. The apparatus performs communication (20) for sending the group message to the plurality of devices by using a protocol for enabling sending the group message in broadcast data to the plurality of devices. The protocol may enable sending the group message in multimedia broadcast/multicast service data or cell broadcast service data to the plurality of devices.

44 Claims, 13 Drawing Sheets

(51) Int. Cl.
| | |
|---|---|
| *H04W 4/70* | (2018.01) |
| *H04W 4/08* | (2009.01) |
| *H04L 12/18* | (2006.01) |
| *H04L 12/58* | (2006.01) |
| *H04W 4/12* | (2009.01) |
| *H04W 4/02* | (2018.01) |

(52) U.S. Cl.
CPC ........... *H04L 51/046* (2013.01); *H04W 4/005* (2013.01); *H04W 4/08* (2013.01); *H04W 4/12* (2013.01); *H04W 4/70* (2018.02); *H04W 4/02* (2013.01)

(56) References Cited

U.S. PATENT DOCUMENTS

| | | | | |
|---|---|---|---|---|
| 8,942,170 | B1* | 1/2015 | Fang | H04W 4/08 370/328 |
| 2010/0080190 | A1* | 4/2010 | Berzin | H04L 45/50 370/331 |
| 2010/0158231 | A1 | 6/2010 | Newberg et al. | |
| 2011/0201365 | A1* | 8/2011 | Segura | H04W 4/005 455/466 |
| 2011/0216674 | A1 | 9/2011 | McDonald et al. | |
| 2012/0106431 | A1* | 5/2012 | Wu | H04W 4/00 370/312 |
| 2013/0080782 | A1* | 3/2013 | Rajadurai | H04L 63/065 713/171 |
| 2013/0294320 | A1* | 11/2013 | Jactat | H04L 12/189 370/312 |
| 2014/0153476 | A1* | 6/2014 | Wang | H04W 4/06 370/312 |
| 2015/0215771 | A1* | 7/2015 | Ranke | H04W 8/12 455/433 |
| 2015/0230065 | A1* | 8/2015 | Zisimopoulos | H04W 4/08 455/414.1 |

OTHER PUBLICATIONS

3GPP TS 23.041 V11.3.0 (Jun. 2012), Technical Specification, 3rd Generation Partnership Project; Technical Specification Group Core Network and Terminals; Technical realization of Cell Broadcast Service (CBS) (Release 11), Jun. 2012, 62 pages.

3GPP TS 23.246 V11.1.0 (Mar. 2012), Technical Specification, 3rd Generation Partnership Project; Technical Specification Group Services and System Aspects; Multimedia Broadcast/Multicast Service (MBMS); Architecture and functional description (Release 11), Mar. 2012, 66 pages.

3GPP TS 36.300 V11.2.0 (Jun. 2012), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Jun. 2012, 201 pages.

3GPP TR 23.887 V0.2.1 (Aug. 2012), Technical Report, 3rd Generation Partnership Project; Technical Specification Group Services and System Aspects; Machine-Type and other Mobile Data Applications Communications Enhancements (Release 12), Aug. 2012, 32 pages.

Extend European Search Report dated Apr. 20, 2016, corresponding the European Application No. 12885067.4.

3GPP Standard; 3GPP TR 23.888, V11.0.0, pp. 1-165, XP050649142, [retrieved on Sep. 18, 2012] * sections 4, 5.8, 6.6, 6.45 * 3rd Generation Partnership Project; Technical Specification Group Services and System Aspects; System improvements for Machine-Type Communications (MTC) (Release 11).

3GPP / 3GPP TS 23.003 V11.2.0 (Jun. 2012); 3rd Generation Partnership Project; Technical Specification Group Core Network and Terminals; Numbering, addressing and identification (Release 11).

* cited by examiner

GROUP MESSAGING IN A COMMUNICATION NETWORK

BACKGROUND OF THE INVENTION

Field of the Invention

The present invention relates to group messaging in a communication network, e.g. a communication network according to EPS.

Related Background Art

Prior art which is related to this technical field can e.g. be found in:

[1] 3GPP TR 23.887 v0.2.1 (August 2012)
[2] 3GPP TS 23.246 v11.1.0 (March 2012)
[3] 3GPP TS 23.041 v11.3.0 (June 2012)

The following meanings for the abbreviations used in this specification apply:

3GPP third generation partnership project
AS application server
BMSC/BM-SC broadcast/multicast service center
CB cell broadcast
CBC cell broadcast center
CBE cell broadcast entity
CBS cell broadcast service
DNS domain name system
E evolved
EDGE enhanced data for GSM evolution
eNB evolved node B
EPS evolved packet system
FQDN fully qualified domain name
GERAN GSM EDGE RAN
GSM global system for mobile communications
GPRS general packet radio system
GW gateway
HPLMN home public land mobile network
IWF interworking function
IMSI international mobile subscriber identity
LA location area
LTE long term evolution
MBMS multimedia broadcast/multicast service
MBSFN multicast-broadcast single frequency network
MCE multi-cell/multicast coordination entity
M2M machine-to-machine
MME mobility management entity
MNO mobile network operator
MTC machine type communication
P packet
PDN packet data network
PLMN public land mobile network
RA routing area
RAN radio access network
RAT radio access technology
S serving
SAI service area identities
SCS services capability server
TA tracking area
UE user equipment
UTRAN universal terrestrial RAN
VPLMN visited public land mobile network EPS is the successor of GPRS. It provides a new radio interface and new packet core network functions for broadband wireless data access. Such EPS core network functions are an MME, a PDN-GW or P-GW, and an S-GW.

A common packet domain core network is used for both RANs, i.e. GERAN and UTRAN. This common core network provides GPRS services.

Besides others, 3GPP is working on group features in Release 12. Group features include group based charging, group policing and group messaging. Group messaging means that a message (e.g. trigger message) can be sent to a potentially huge number of devices forming a group. Group messaging requirements may apply for MTC devices, smart phones and other devices such as tablets (e.g. for software update notification). Sending messages to a group of devices is also a key requirement for public safety networks.

SUMMARY OF THE INVENTION

The present invention aims at providing enhanced solutions for group messaging in a communication network, e.g. a communication network according to an EPS and/or an LTE system.

This is achieved by the method and apparatus as defined in the appended claims. The invention may also be implemented by a computer program product.

According to an embodiment of the invention, existing MTC and MBMS/CBS architectures can be re-used maximally.

Solutions are presented that are applicable for group messaging but many aspects, the architecture in general, providing MME addresses and MBMS SAI from IWF to MBMS GW, is useful in other scenarios like LTE public safety as well.

Similar architectures and functionalities described in accordance with EPS can be applied for GERAN/UTRAN.

Optimizations and functionalities introduced for MBMS option 1 (implementation example 1) may also be re-used for public safety group communication.

In the following the invention will be described by way of embodiments thereof with reference to the accompanying drawings.

DESCRIPTION OF THE EMBODIMENTS

Figure 1:
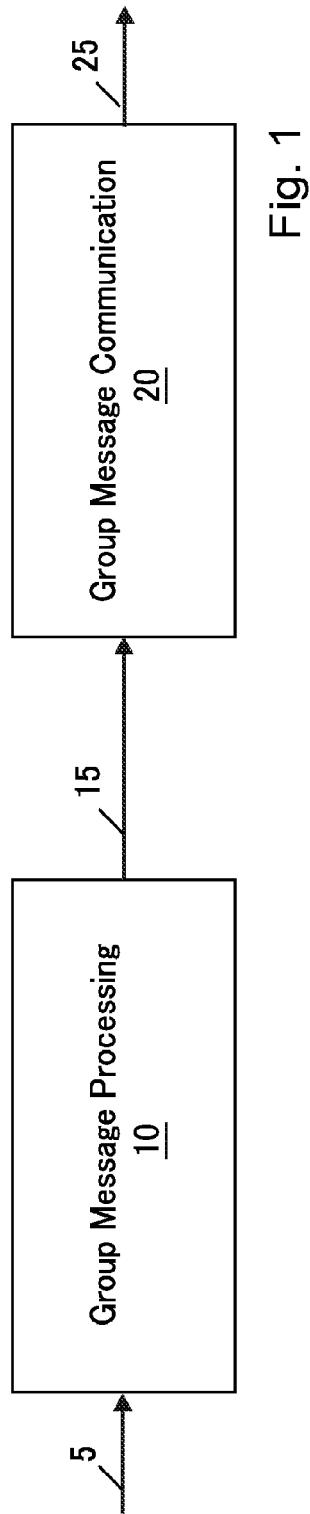
FIG. 1 shows a schematic block diagram for illustrating an embodiment of the invention.

FIG. 1 shows a block diagram illustrating an embodiment of the invention.

In a processing block 10 processing for a group message is performed, which is to be sent to a plurality of devices. The group message includes an application layer content and a group identification for identifying the plurality of devices. In a communication block 20 communication is performed, for sending the group message to the plurality of devices by using a protocol for enabling sending the group message in broadcast data to the plurality of devices.

The processing block 10 may receive data via a link 5 and output processed data to the communication block 20 via a link 15. The communication block 20 may receive the data output from the processing block 10 via the link 15, modify the data for communication, and output communication data via a link 25.

The operations of the processing block 10 and the communication block 20 may be performed by a method, which may be used by an apparatus of a communication network.

The protocol may enable sending the group message in multimedia broadcast/multicast service data or cell broadcast service data to the plurality of devices.

Further, at least the application layer content and group identification of the group message are communicated via an inter-domain control plane interface. That is, the link 25 comprises the inter-domain control plane interface, which may be referred to as Tsp.

The group message may further include information on a location area (location area information) and/or a radio access technology (RAT information) in which the group message is to be distributed.

In the following, embodiments of the invention will be described in more detail by referring to MTC group messaging in a 3GPP system. However, the invention is not limited to MTC devices.

Figure 2:
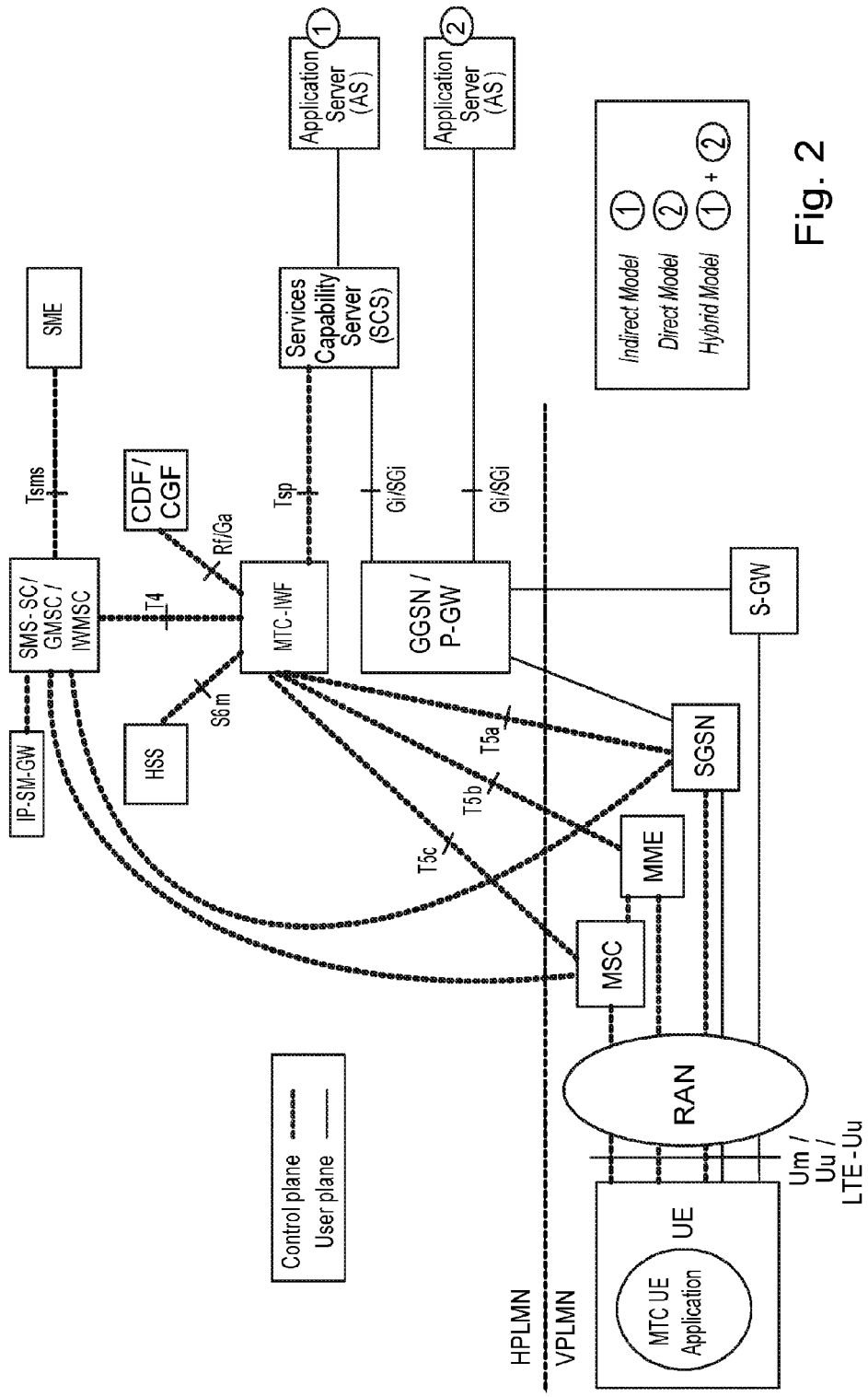
FIG. 2 shows a 3GPP architecture for machine-type communication.

For MTC, a new functional entity called MTC-IWF and some new interfaces, e.g., S6m, Tsp, Tsms, T5a/b/c and T4, were introduced to the 3GPP architecture as shown in FIG. 2. Main purpose of the MTC-IWF (or shortly IWF) and the new interfaces in 3GPP Release 11 is to enable triggering of devices, e.g., in order to establish a PDN connection/PDP context, with or without MSISDN from an internal or external MTC application server.

FIG. 2 shows an application server connected to an SCS, which in turn is connected via a control plane interface Tsp to an MTC-IWF. The MTC-IWF is connected to an HSS, MSC, MME, SGSN and SMS-SC/GMSC/IWMSC via control plane interfaces S6m, T5a/b/c and T4. The SMS-SC/GMSC/IWMSC is connected to an SME via a control plane interface Tsms.

For MTC group messaging the 3GPP system provides the interface Tsp for the SCS to send a group message (cf. reference [1]). This interface may carry the following information:

The application layer content of the group message,
The group identification for which the group message is intended, and
Optionally, the location/area (also referred to as location area in the following) and RAT(s) in which the group message is to be distributed.

The geographic area for the distribution may be a cell sector, a cell, a group of cells, or a PLMN. Any members of the group who are outside the geographic area will not receive the message. The system maps between location/area information provided by the SCS and the geographic area for the distribution of the group message based on a configuration in an operator domain.

According to embodiments of the invention, solutions for group messaging are provided that fulfill the above requirements, re-using the 3GPP features "MBMS" and "CBS", and integrating the MTC architecture of FIG. 2 with the known MBMS and CBS architectures. Regarding the MBMS architecture it is referred to reference [2], and regarding CBS in GERAN/UTRAN/E-UTRAN it is referred to reference [3]. Furthermore, embodiments of the invention propose useful optimizations, additional/modified functionalities to fulfill the group messaging requirements in an optimized manner.

In the following, implementation examples of the invention for group based messaging using MBMS and CBS are described, mainly in the context of EPS and E-UTRAN. However, embodiments of the invention can also be implemented with GERAN/UTRAN as the architectures are quite similar and it is not intended to change the basic MBMS and CBS procedures and protocols.

1. MBMS Based Group Messaging Solutions

Figure 3:
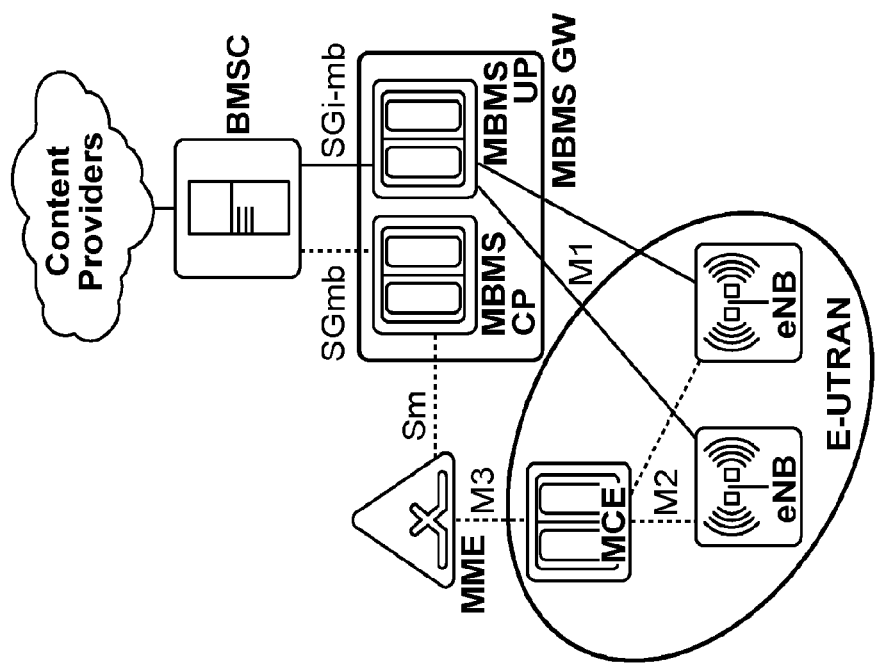
FIG. 3 shows a 3GPP architecture for MBMS in EPS.

The current MBMS architecture for EPS is depicted in FIG. 3. A BMSC, receiving contents from content providers, has interfaces SGmb and SGi-mb to an MBMS GW. The MBMS GW has interfaces Sm and M1 to an MME and eNBs of an E-UTRAN. The MME has an interface M3 to an MCE which has interfaces M2 to the eNBs.

The GERAN/UTRAN architecture for MBMS is quite similar: BMSC has direct interfaces to a GGSN called Gi and Gmb instead of SGi and SGi-mb in EPS. Major difference is that in EPS the MBMS GW is directly broadcasting the content to the eNBs while in GPRS content goes via SGSN. In GPRS the roaming interface Mz between BMSC in VPLMN and BMSC in HPLMN has been defined while this interface is currently not supported for EPS. However, Mz can in principle also apply to EPS.

In the following, three implementation examples will be described how to use MBMS for MTC group messaging. As mentioned above, these architectural options can be re-used for general group messaging (not limited to MTC devices but can be applied for all devices such as mobile phones, smart phones, tablets, dongles) and public safety group communication.

Figure 4:
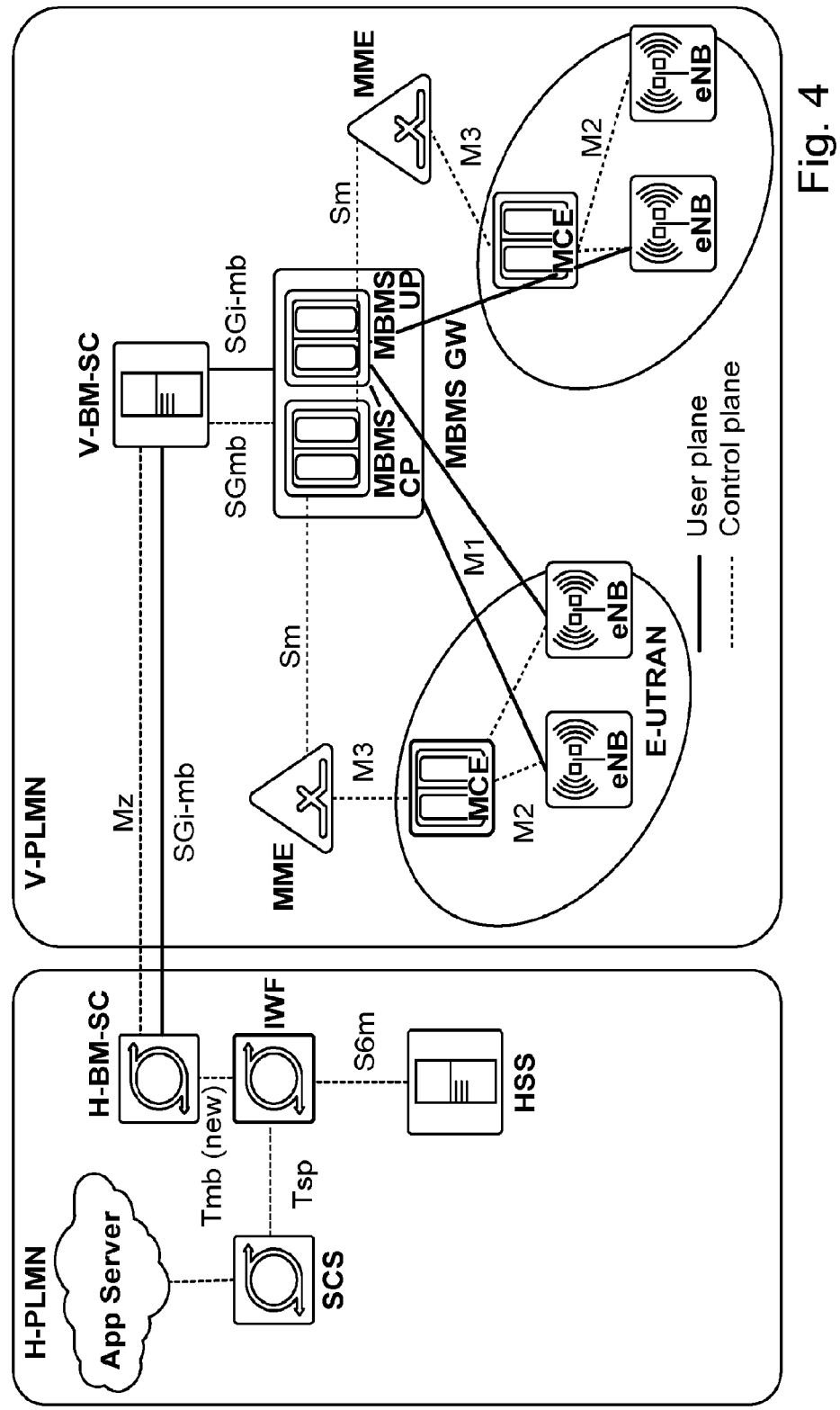
FIG. 4 shows an MBMS based group messaging architecture according to a first implementation example of the invention.
Figure 5:
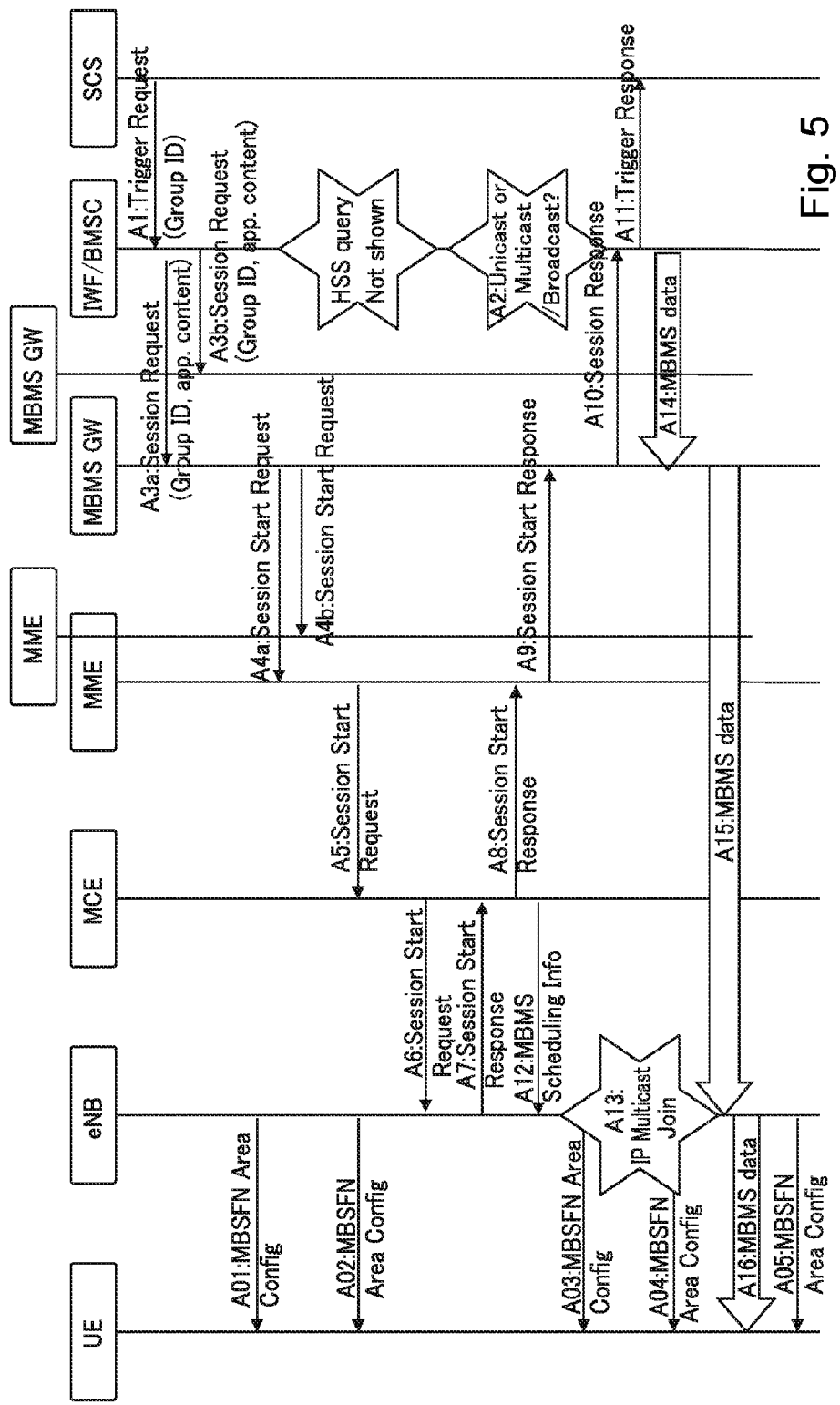
FIG. 5 shows a group messaging signaling flow according to the first implementation example.

First Implementation Example: IWF Acting as MBMS Content Provider Towards BMSC In this first implementation example, the MTC-IWF (shortly IWF) acts as a MBMS content provider towards the BMSC. In the roaming case this BMSC is the H-BMSC located in HPLMN. The application server (shown in FIG. 2) provides the content to be broadcasted and additional information to the SCS which forwards these data over Tsp to IWF. In case IWF and BMSC are not co-located a new interface Tmb between them is required. FIG. 4 shows a group messaging roaming architecture for the first implementation example, and FIG. 5 illustrates the group messaging signaling when a new MBMS session is established.

The interface SGi-mb between H-BM-SC and V-BM-SC is optional for group messaging as the content can be delivered to the V-BM-SC using the control plane interface Mz and this is a useful optimization to the existing MBMS architecture.

As shown in FIG. 4, the SCS is connected to an application server and to the IWF via the Tsp interface. The IWF has interfaces S6m to the HSS and Tmb to the H-BMSC. The H-BMSC has interfaces Mz (control plane) and SGi-mb (user plane, FIG. 3) to the V-BMSC in a V-PLMN. The remaining architecture of the V-PLMN shown in FIG. 4 corresponds to that of FIG. 3.

Following functional enhancements for the various entities and interfaces are provided according to the first implementation example.

SCS:

In general, according to an embodiment of the invention, the operations of the processing block 10 and the communication block 20 are performed by the SCS, and the communication block 20 comprises sending a group message trigger request including at least the group identification (e.g. Group ID) and the application layer content (message content) via the inter-domain control plane interface, e.g. Tsp, for triggering a session start request for the group message according to a multimedia broadcast/multicast service (MBMS). This operation corresponds to step A1 in FIG. 5.

In particular, the SCS sends a group message trigger request with Group ID, Message Content, location area (optionally) and the RATs (optionally) where the group message is to be distributed to the IWF via Tsp interface (cf. step A1 in FIG. 5).

IWF:

In general, according to an embodiment of the invention, the operations of the processing block 10 and the communication block 20 are performed by the IWF, and the communication block 20 comprises receiving a group message trigger request including at least the group identification (Group ID) and the application layer content via the inter-domain control plane interface, e.g. Tsp, for triggering a session start request for the group message according to a multimedia broadcast/multicast service (MBMS). Upon receiving the group message trigger request, the IWF obtains serving node addresses and international mobile subscriber identities for the plurality of devices, includes the group identification, the application layer content and serving node addresses in a session request, and sends the session request via at least one dedicated interface, e.g. Tmb.

In particular, the IWF receives group message content (application layer content) and additional information from the SCS via Tsp. The IWF may authorize/authenticate the group message request for the given Group ID, generate CDRs for requests coming from SCS, and interface with the HSS via S6m to retrieve serving node addresses, i.e., MMEs where the devices that belong to the group are attached, optionally an MBMS GW address (an address of a multimedia broadcast/multicast service gateway), and retrieve IMSIs of the group devices. This retrieval could be done either based on Group ID or the given location area. Instead of querying the HSS, serving node addresses can optionally be determined by using location area/serving area.

The IWF may translate the given location area which may be, e.g., a geographic area like New York City, to applicable MBMS service areas, that may consist of up to 256 MBMS SAIs, that are used for broadcasting messages via MBMS based on a mapping table or by querying an external database like the HSS.

Based on information how many UEs of the group are actually attached, size of the message, serving node capabilities, UE capabilities, UE's current location information, e.g., whether the UE is roaming, in which networks the UEs are roaming, the IWF may decide to send the group message either in unicast mode (e.g. using SMS over T4 interface, using generic format over T5 interface) or in broadcast/multicast mode (cf. step A2).

If the IWF chooses to perform the broadcast mode, it also has the capability to authorize MBMS services, so that BM-SC does not have to perform authentication and this can help save signaling generated due to additional authentication procedure.

The IWF includes Group ID, message content, serving node addresses, MBMS GW address (optional), MBMS service areas (SAI(s)), RATs (optional) in the session request message to BMSC via the new interface Tmb: optionally, IWF and BMSC can be co-located. If so, Tmb becomes a node internal interface. If they are not co-located, the IWF routes the request to BMSC based on a configured BMSC address, e.g., FQDN which is resolved in DNS to an IP address, or depending on the Group ID, i.e., different BMSCs can be allocated for different groups for load distribution. In case of roaming, the IWF routes the request to H-BMSC in HPLMN.

HSS:

In general, according to an embodiment of the invention, the operations of the processing block 10 and the communication block 20 are performed by the HSS, and the processing block 10 comprises providing user subscription information based on the group identification (e.g. Group ID), and optionally providing serving node addresses, MBMS gateway address and/or capabilities based on the group identification and/or the location area.

In particular, the HSS provides user subscription information based on the given Group ID, and may retrieve serving node addresses and capabilities based on the Group ID or given location area/service area.

H-BMSC:

In general, according to an embodiment of the invention, the operations of the processing block 10 and the communication block 20 are performed by the H-BMSC, and the communication block 20 comprises, depending on a domain of serving nodes for the plurality of devices, forwarding a session request for the group message according to a multimedia broadcast/multicast service (MBMS) via a dedicated control plane interface, e.g. Mz, or a user plane interface, e.g. SGi-mb, from a home network to a visited network, and providing the application layer content via the dedicated control plane interface or the user plane interface from the home network to the visited network (cf. step A14), or selecting a multimedia broadcast/multicast service gateway (if this is not provided by the IWF) for performing broadcast and/or a radio access technology based on the group message and sending (cf. steps A3a, A3b in FIG. 5) a session request for the group message to the selected multimedia broadcast/multicast service gateway, retrieving serving node address(es) for the group of devices depending on where they are currently registered, and sending the session request including information on the serving node address(es) and/or multimedia broadcast/multicast service area information.

In particular, depending on the domain of the serving nodes, the H-BMSC forwards the request to potentially several V-BMSCs, the addresses of which can be pre-configured as FQDN in H-BMSC, and can depend on the given Group ID, i.e. different V-BMSCs for different groups/users in the group. For users within the home domain, the H-BMSC initiates a broadcast session in the home network and selects the MBMS GW through which broadcast should be performed (if this is not provided by the IWF). For example, the H-BMSC uses load balancing algorithms based on load information from MBMS GW or a simple round-robin method, and decides in which RATs the message has to be broadcasted based on the received information, e.g. only in E-UTRAN or in GERAN/UTRAN.

The H-BMSC forwards serving node (e.g. MME) information and MBMS service area information to the MBMS GW(s) (cf. steps A3a, A3b in FIG. 5). If serving node information is not received from IWF, the H-BMSC can determine serving nodes either based on MBMS Service Area (SAIs) or by querying the HSS.

In the roaming case the H-BMSC provides the message content (application layer content) to the V-BMSC over the user plane or directly over the control plane roaming interface Mz (cf. step A14).

As the IWF is a trusted network element within MNO domain and it already has authorized the request, for session requests originating from IWF, H-BM-SC can skip authorization for MBMS services to avoid additional processing and signaling.

V-BMSC:

In general, according to an embodiment of the invention, the operations of the processing block 10 and the communication block 20 are performed by the V-BMSC, and the communication block 20 comprises authenticating/authorizing a session request for the group message according to a multimedia broadcast/multicast service (MBMS), receiving the application layer content via a dedicated control plane interface, e.g. Mz, or a user plane interface, e.g. SGi-mb, from a home network, selecting a multimedia broadcast/multicast service gateway for performing broadcast and/or a radio access technology based on the group message and sending a session request for the group message to the selected multimedia broadcast/multicast service gateway, retrieving serving node address(es) for the group of devices depending on where they are currently registered, and sending the session request including information on the serving node address(es) and/or multimedia broadcast/multicast service area information.

In particular, the V-BMSC authenticates/authorizes a request from the H-BMSC. If the message content (application layer content) was provided over the control plane interface, it may retrieve the message content and store it so that it can be later provided to MBMS GW over the user plane interface SGi-mb upon establishing an MBMS session. Other functions of the V-BMSC are similar to those mentioned above when describing operations of the H-BMSC when the user is in the home domain.

MBMS GW:

In general, according to an embodiment of the invention, the operations of the processing block 10 and the communication block 20 are performed by the MBMS GW, and the communication block 20 comprises determining serving nodes from serving node address information included in a session request and/or multimedia broadcast/multicast service area information included in the session request and/or by querying a home subscription server, sending (cf. steps A4a, A4b) a session start request to the determined serving nodes (e.g. MMEs) to establish a multimedia broadcast/multicast service (MBMS) session, and providing (cf. step A15) the application layer content via IP multicast to base stations which join (e.g. in step A13) the multimedia broadcast/multicast service session.

If serving node information is not received from a BMSC, it can determine serving nodes either based on MBMS service area or by querying the HSS.

The MBMS GW interfaces with different MME(s) to establish a MBMS session. It provides the message content via IP multicast to the different eNBs (cf. step A15), which joined the multicast group (e.g. in step A13).

In the further steps shown in FIG. 5, the MME forwards the session start request to an MCE (step A5), and the MME forwards the session start request to the eNB (step A6). The eNB responds with a session start response (step A7) which is forwarded by the MCE to the MME (step A8), and from the MME to the MBMS GW (step A9). The MBMS GW responds to the session request from the IWF/BMSC with a session response (step A10), and the IWF/BMSC responds to the trigger request from the SCS with a trigger response (step A11).

The MCE may send MBMS scheduling information to the eNB in step A12. eNB(s) will join the IP multicast. MBMS GW provides the application layer content via IP multicast to base stations which join the multimedia broadcast/multicast service session. The eNB forwards the MBMS data received from the MBMS GW to a device (UE) of the plurality of devices of the messaging group in step A16.

The communications in steps A01-A05 serve to provide an MBSFN area configuration from the eNB to the UE.

Second Implementation Example: SCS Co-Located with BMSC

Figure 6:
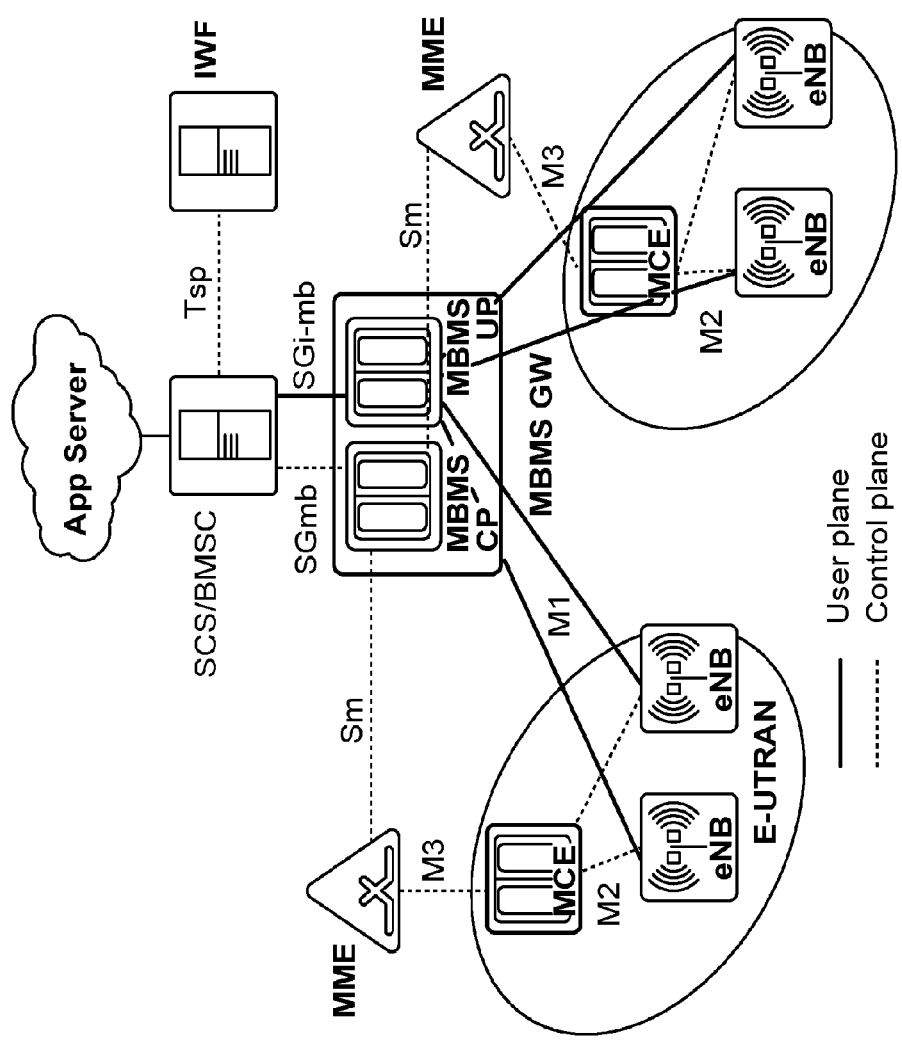
FIG. 6 shows an MBMS based group messaging architecture according to a second implementation example of the invention.
Figure 7:
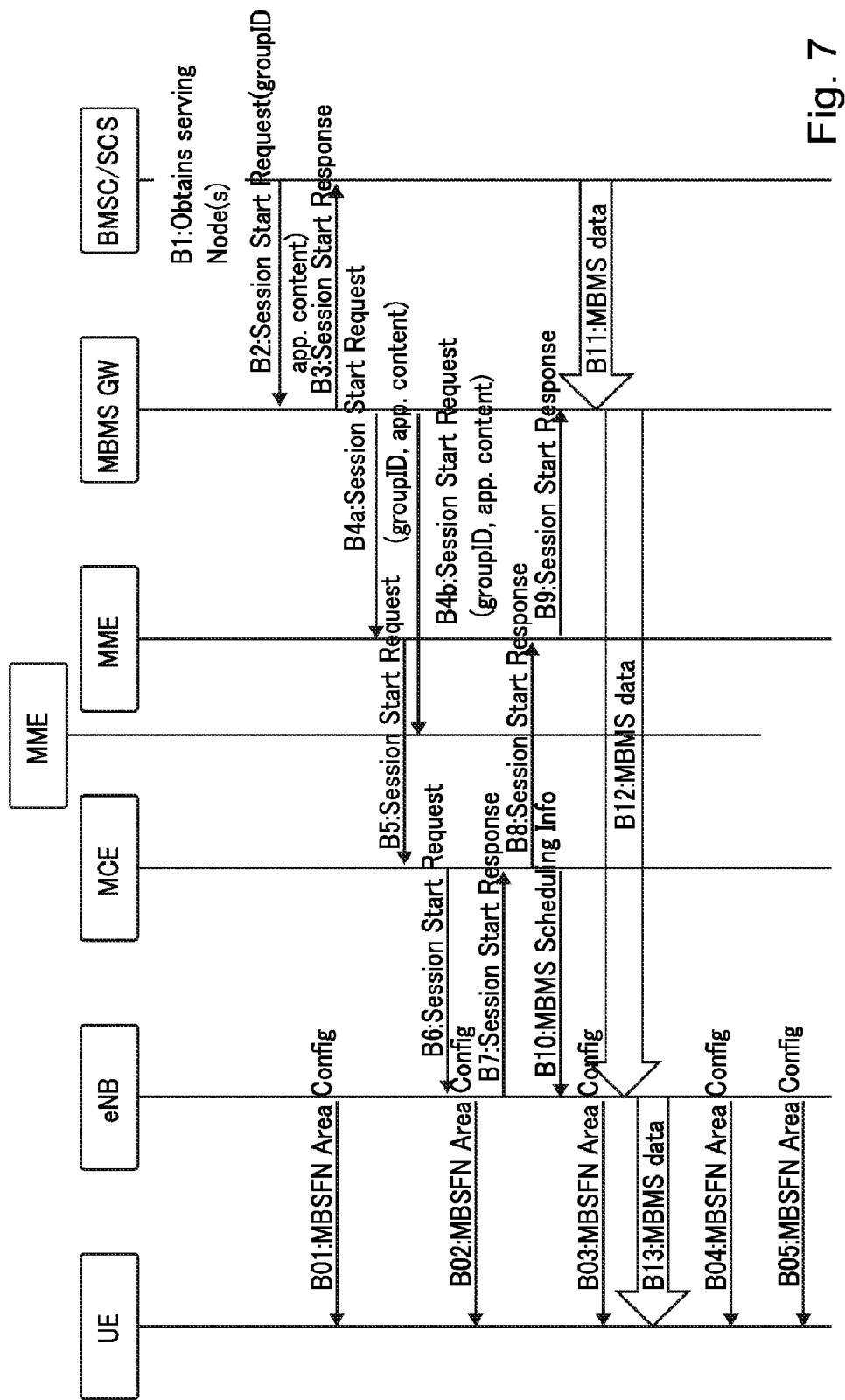
FIG. 7 shows a group messaging signaling flow according to the second implementation example.

In this implementation example, SCS and BMSC are both located in the MNO domain and both are co-located. While SCS in theory can be located in the service provider domain it is more likely that it will be part of MNO's domain so that MNO can provide value-added services to the M2M service provider. FIG. 6 shows the architecture for this option, and FIG. 7 illustrates the group messaging signaling when a new MBMS session is established.

In the roaming case SCS/BMSC has to provide an Mz interface to the BMSC in the VPLMN. The second implementation example does not involve IWF and Tsp interface from SCS to IWF, i.e. it is a standalone group messaging architecture. SCS acts as BMSC and the MTC application server as a MBMS content provider. However, Tsp is supported at SCS/BMSC towards IWF for sending unicast messages like peer-to-peer device trigger requests (e.g. SMS over T4 interface) to single UEs. The remaining components of the architecture of FIG. 4 correspond to those of FIG. 3.

Following functional enhancements for the various entities and interfaces are required according to the second implementation example.

SCS/BMSC:

In general, according to an embodiment of the invention, the operations of the processing block 10 and the communication block 20 are performed by the SCS/BMSC, and the communication block 20 comprises receiving (cf. step B1) the application layer content and the group identification (e.g. Group ID) from an application server, authenticating/authorizing a session request for the group message according to a multimedia broadcast/multicast service (MBMS), including the group identification, serving node address information and multimedia broadcast/multicast service area information in the session request, and selecting a multimedia broadcast/multicast service gateway for performing broadcast based on the group identification and the broadcast/multicast service areas and/or a configuration, and sending (cf. step B2) the session request to the selected multimedia broadcast/multicast service gateway.

In particular, the SCS/BMSC receives a group message content (application layer content) and additional information from an external application server in a group message request (step B1). The SCS/BMSC authorizes/authenticates the group message request for the given Group ID. The SCS/BMSC may generate CDRs for requests coming from application server, and translate the received location area information, which may be a geographic area, to the applicable MBMS service areas.

The SCS/BMSC may interface with the HSS to obtain the MBMS GW/serving node (MME) information based on the Group ID (this interface is not shown in FIG. 6). This is optional as the SCS/BMSC can determine serving nodes (MMEs) based on location area/service area and use pre-configured MBMS GW addresses or select MBMS GW using load balancing algorithms (select the MBMS GW based on a configuration). For example, the SCS/BMSC can use load balancing algorithms based on load information from MBMS GW or a simple round-robin method, and decides in which RATs the message has to be broadcasted based on the received information, e.g. only in E-UTRAN or in GERAN/UTRAN.

The SCS/BMSC sends (step B2) a session request message to appropriate MBMS GW(s) based on Group ID or configuration.

The SCS/BMSC may route the group message request to appropriate MBMS GW(s) based on the Group ID and MBMS Service Area. Optionally, the SCS/BMSC provides the serving node information obtained from HSS to the MBMS GW(s) in the session start request.

Further, optionally the SCS/BMSC analyzes the number of UE(s) within the group that are attached and the cells they are camping on and decides whether to use unicast (e.g. over Tsp interface to IWF as shown in FIG. 6) or broadcast/multicast.

The SCS/BMSC may include the Group ID, serving node addresses, MBMS service areas (SAI(s)), RATs (optional) in the session start request message to the MBMS GW(s).

MBMS GW:

In general, according to an embodiment of the invention, the operations of the processing block 10 and the communication block 20 are performed by the MBMS GW, and the communication block 20 comprises determining serving nodes from serving node address information included in a session request and/or multimedia broadcast/multicast service area information included in the session request and/or by querying a home subscription server, sending (cf. steps B4a, B4b) a session start request to the determined serving nodes to establish a multimedia broadcast/multicast service session, and providing the application layer content via IP multicast to base stations which join the multimedia broadcast/multicast service session.

In particular, the MBMS GW provides (step B12) the message content (application layer content, MBMS data) via IP multicast to the different eNBs, which joined the multicast group. The MBMS data have been received from the BMSC/SCS in step B11.

If serving node information is not received from the SCS/BMSC, the MBMS GW can determine serving nodes from location area/service area or interfaces with the HSS or any other database. The MBMS GW establishes MBMS sessions with the different serving nodes (MMEs) (steps B4a, B4b).

In the further steps shown in FIG. 7, the MBMS GW responds to the session start request from the BMSC/SCS with a session start response in step B3. Steps B5-B10 and steps B01-B05 in FIG. 7 correspond to steps A5-A9 and A11 and steps A01-A05 in FIG. 5.

Third Implementation Example: MTC-IWF Co-Located with BMSC

Figure 8:
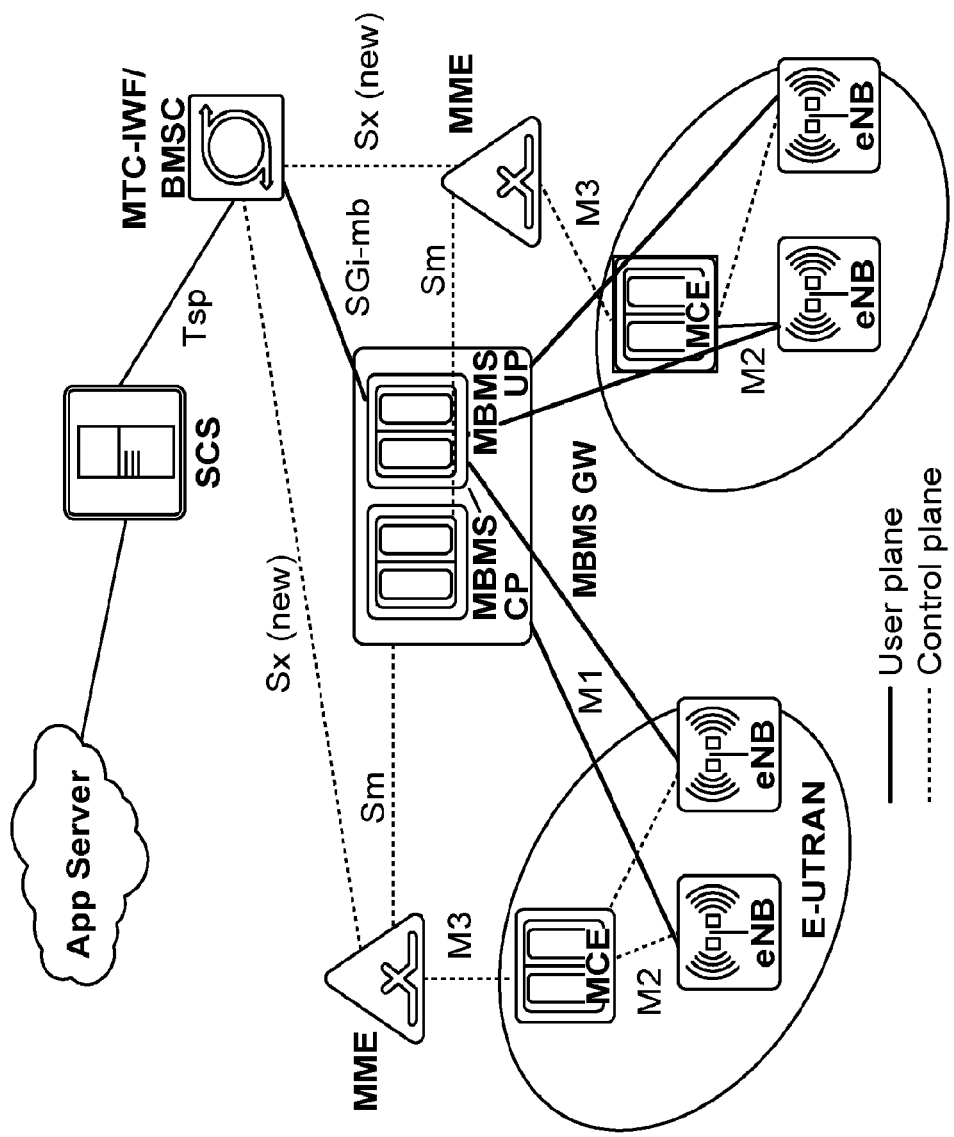
FIG. 8 shows an MBMS based group messaging architecture according to a third implementation example of the invention.
Figure 9:
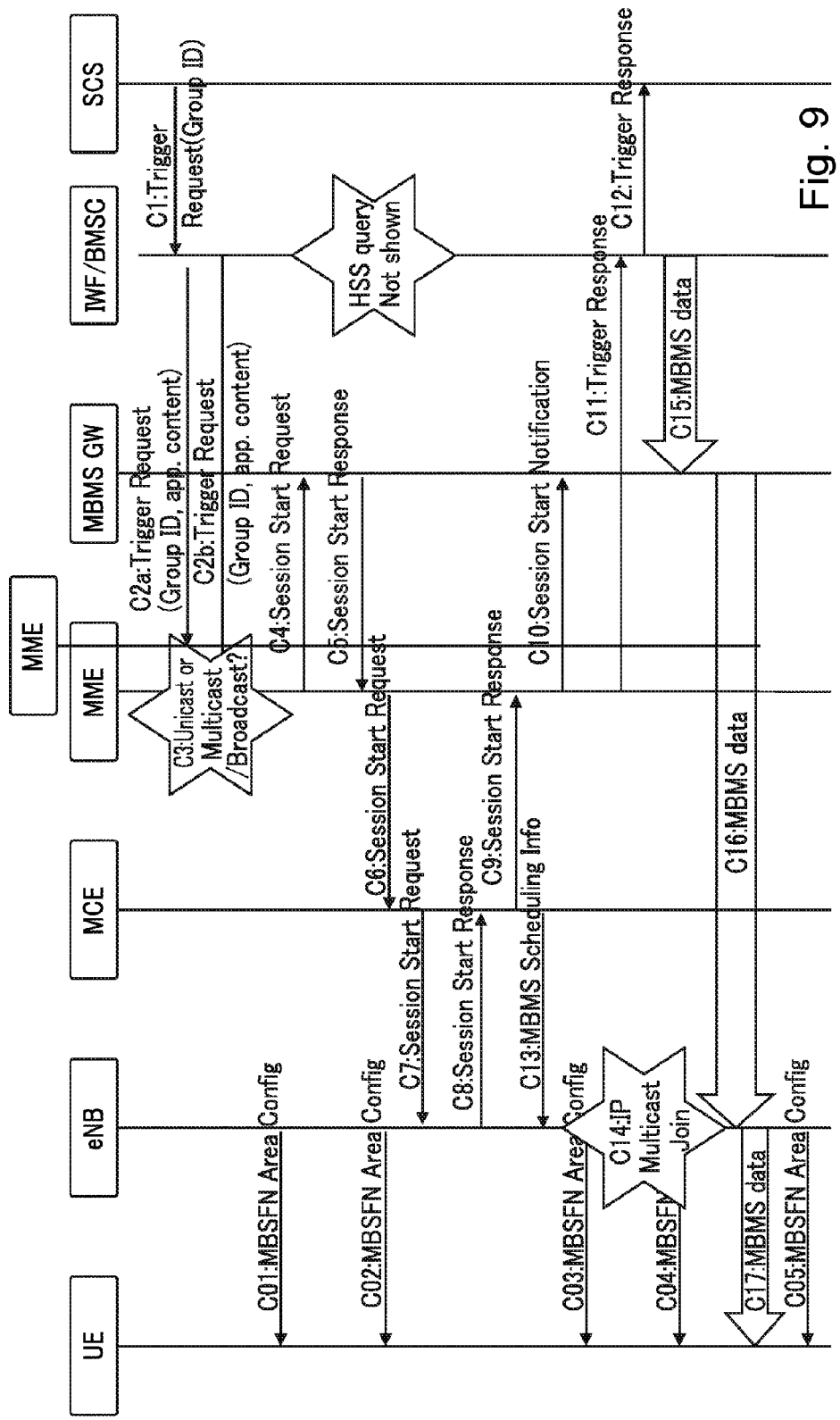
FIG. 9 shows a group messaging signaling flow according to the third implementation example.

In this variant the BMSC is co-located with the MTC-IWF in the MNO domain as shown in FIG. 8, and MME selects the proper MBMS GW. This variant i.e. "MME selects the proper MBMS GW" can also be combined with the first implementation example or the second implementation example. MME(s) may select a single MBMS GW using a central load balancer function or they may select different MBMS GW(s) depending on operator policies. This alternative may be beneficial to re-use existing load balancing functionality available in the MME for selecting GW(s) like PGW. If IP multicasting is operationally possible only within smaller sub-nets (of eNBs) and the group messaging is targeted for a big location (e.g. nationwide), then having different MBMS GWs serving the different sub-nets may be beneficial from an operational point of view. FIG. 9 illustrates the group messaging signaling when a new MBMS session is established.

As shown in FIG. 8, a dedicated control plane interface Sx is provided between the MTC-IWF/BMSC and the MMEs. The application server provides the content to be broadcasted to the SCS which forwards these data via the Tsp interface to the MTC-IWF/BMSC. The further components shown in FIG. 8 are similar to those illustrated in FIG. 3.

Following functional enhancements for the various entities and interfaces are required according to the third implementation example.

MTC-IWF/BMSC:

In general, according to an embodiment of the invention, the operations of the processing block 10 and the communication block 20 are performed by the MTC-IWF/BMSC, and the communication block 20 comprises receiving (step C1) a group message trigger request including at least the group identification (e.g. Group ID) and the application layer content via the inter-domain control plane interface (e.g. Tsp) for triggering a session start request for the group message according to a multimedia broadcast/multicast service (MBMS). Upon receiving the group message trigger request, the MTC-IWF/BMSC obtains serving node addresses for the plurality of devices, and forwards (C2a, C2b) the group message trigger request to the obtained serving node addresses via a dedicated control plane interface, e.g. Sx.

In particular, the MTC-IWF/BMSC receives (step C1) the group message and additional information (e.g. location area information) from SCS via Tsp interface. The MTC-IWF/BMSC may interface with the HSS and obtain the serving node (MME) information for the corresponding Group ID and service area.

The MTC-IWF/BMSC may map the location area to an MBMS service area.

The MTC-IWF/BMSC routes (steps C2a, C2b) the group message to appropriate serving nodes and includes MBMS service area information.

MME:

In general, according to an embodiment of the invention, the operations of the processing block 10 and the communication block 20 are performed by the MME, and the communication block 20 comprises receiving a group message trigger request including at least the group identification (Group ID) and the application layer content via a dedicated control plane interface (e.g. Sx), upon receiving the trigger request and determination of the need for multicast, selecting a multimedia broadcast/multicast service gateway for performing broadcast based on configuration and load information, and sending (step C4) a session start request to the selected multimedia broadcast/multicast service gateway to establish a multimedia broadcast/multicast service session.

In particular, the MME receives the group message and additional information (e.g. MBMS SAI) from IWF/BMSC via the Sx interface. The MME may analyze the number of UE(s) within the group that are attached in the MBMS service areas and the cells they are camping on and determine the need for IP multicast within the core network, i.e. whether it is useful to broadcast the message or send unicast messages to single UE(s) (step C3).

Upon determination of the need for IP multicast, the MME selects the proper MBMS GW based on configuration and load information, e.g., using a central load balancer function that selects one MBMS GW for all MMEs, and establishes (step C4) the MBMS session to the MBMS GW. MME also establishes MBMS session with the different MCEs (step C6).

MBMS GW:

In general, according to an embodiment of the invention, the operations of the processing block 10 and the communication block 20 are performed by the MBMS GW, and the communication block 20 comprises receiving a session start request to establish a multimedia broadcast/multicast service session, and responding to the session start request with an IP multicast address (step C5).

In particular, the MBMS GW receives the MBMS session start request from MMEs. The MBMS GW has to optionally correlate different sessions and replies back to MMEs with the IP multicast address.

The further steps C6-C17 and C01-C05 shown in FIG. 9 correspond to steps A5-A16 and A01-A05 illustrated in FIG. 5.

2. CBS Based Group Messaging Solutions

Figure 10:
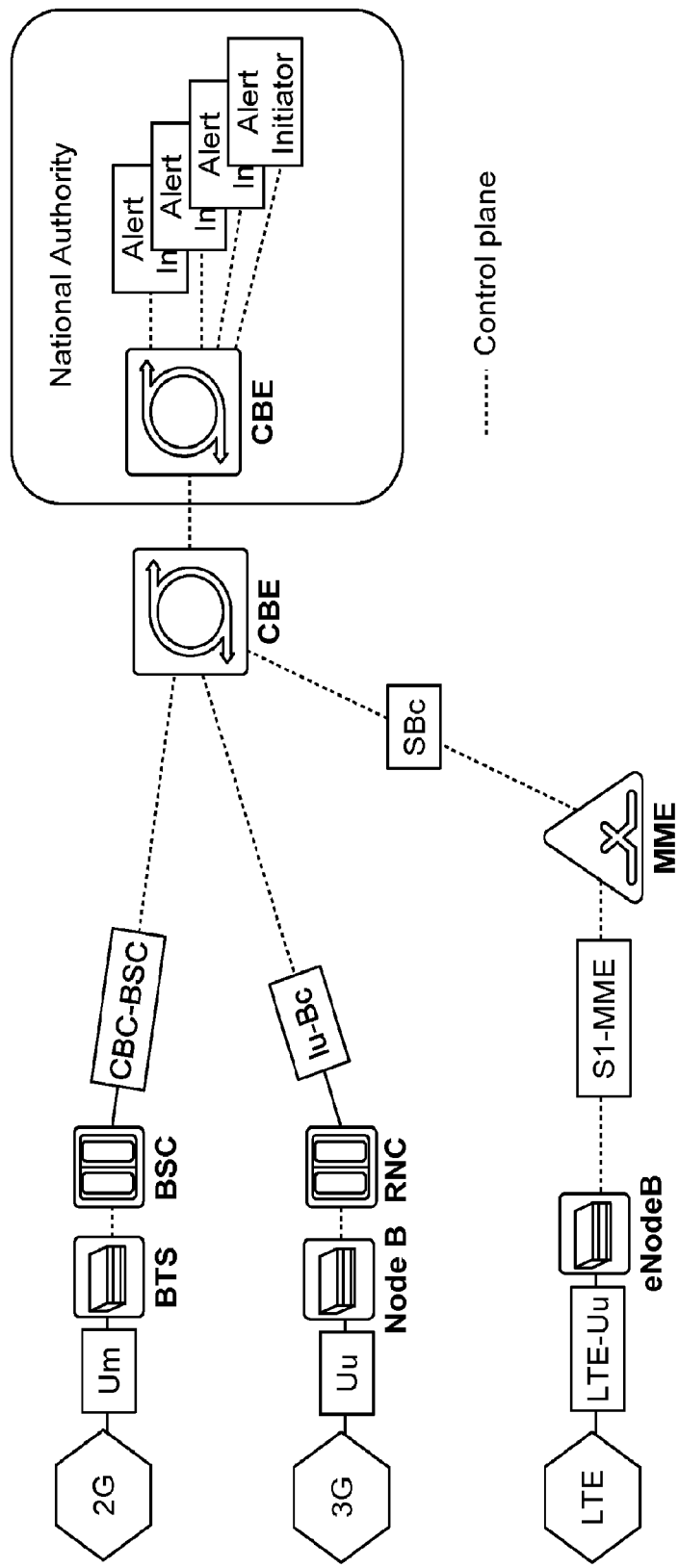
FIG. 10 shows a warning system architecture for GERAN, UTRAN and E-UTRAN using CBS.

The current warning system architecture for GERAN, UTRAN and E-UTRAN using CBS is depicted in FIG. 10. A CBE of a national authority has interfaces to several alert initiators, and an interface to a CBC. The CBC has interfaces CBC-BSC, Iu-BC and SBc to a BSC, an RNC and an MME. The MME interfaces with an eNodeB via S1-MME. The BSC interfaces with a BTS, and the RNC interfaces with a NodeB. The BTS, NodeB and eNodeB have interfaces Um, Uu, LTE-Uu to 2G devices, 3G devices and LTE devices.

Two implementation examples (fourth and fifth implementation example) are proposed how to use CBS for MTC group messaging. As CBS is a control plane mechanism and does not scale efficiently it may not be used when the devices are distributed over a wide area and the message size is rather big.

Fourth Implementation Example: MTC-IWF Acts as CBC and SCS as CBE

Figure 11:
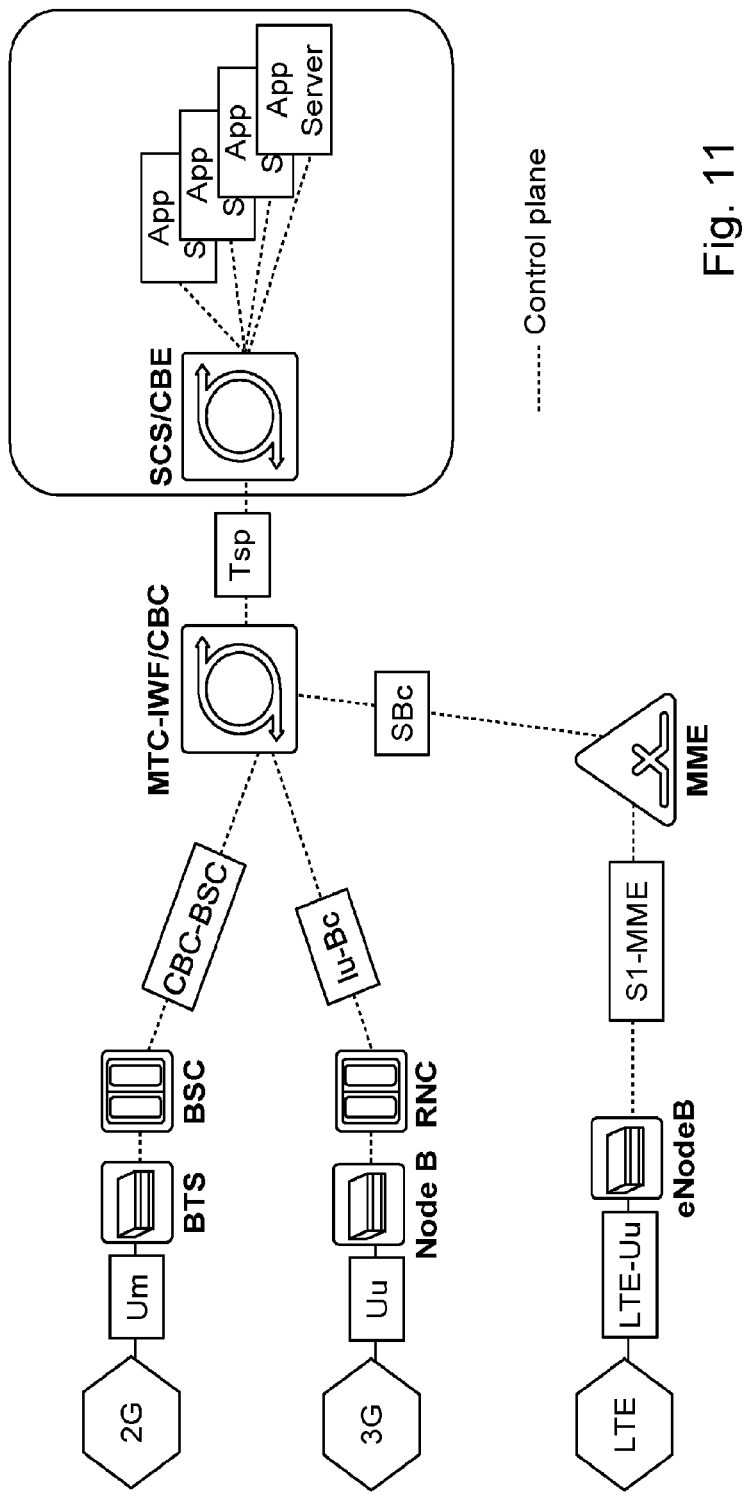
FIG. 11 shows a CBS group messaging architecture according to a fourth implementation example of the invention.

In this variant the IWF takes the role of a CBC and the SCS that of a CBE in terms of cell broadcast service, as illustrated in FIG. 11. In this option, the CBE and CBC are interfaced via Tsp, and the CBE receives message contents from application servers. The remaining components shown in FIG. 11 are similar to those illustrated in FIG. 10.

Following functions are required according to the fourth implementation example.

SCS/CBE:

In general, according to an embodiment of the invention, the operations of the processing block 10 and the communication block 20 are performed by the SCS/CBE, and the communication block 20 comprises sending a cell broadcast request including at least area information, the group identification and the application layer content via the inter-domain control plane interface, e.g. Tsp, for the group message according to a cell broadcasting service (CBS).

In particular, the SCS/CBE supports CBE functionality, and may provide content to be broadcast, group identifier, geographical area information (e.g. TA list/Cell ID list) to the CBC to identify the appropriate MME. Optionally, the SCS/CBE provides RATs to the CBC, where the message is to be broadcasted.

IWF/CBC:

In general, according to an embodiment of the invention, the operations of the processing block 10 and the communication block 20 are performed by the IWF/CBC, and the communication block 20 comprises receiving a cell broadcast request including at least area information and the application layer content via the inter-domain control plane interface, e.g. Tsp, for the group message according to a cell broadcasting service (CBS). Upon receiving the cell broadcast request, the IWF/CBC identifies serving nodes (e.g. MME/BSC/RNC) for requesting start of cell broadcasting, based on the area information and/or radio access technology information, includes at least an identification for group messaging and the application layer content in a cell broadcast start request, and sends the cell broadcast start request to the identified serving nodes or all known serving nodes for requesting start of cell broadcasting.

In particular, the IWF/CBC authenticates and authorizes requests coming from the SCS/CBE, especially the location area where the message shall be broadcasted. The IWF/CBC identifies the appropriate MME/BSC/RNC to initiate cell broadcast based on location and RAT information or sends the request to all known serving nodes.

Optionally, the IWF/CBC maps location area information to appropriate CB service area/TA list/Cell ID list. The IWF/CBC uses existing protocols on CBC-BSC, Iu-Bc and SBc to send the group message to MME/BSC/RNC. The IWF/CBC includes a special indication (e.g. Group ID) for group messaging so that MME/BSC/RNC can differentiate group messages from warning message delivery. This is important so that the MME/BSC/RNC does not prioritize the group message request originating from the CBC.

MME:

In general, according to an embodiment of the invention, the operations of the processing block 10 and the communication block 20 are performed by the MME, and the communication block 20 comprises receiving a cell broadcast start request including at least an identification for group messaging and the application layer content, and forwarding the cell broadcast start request including the application layer content to access nodes (e.g. eNodeBs) via which the plurality of devices access the communication network, for initiating cell broadcast.

In particular, the MME receives a special indication (e.g. Group ID) for group messaging from the IWF/CBC. Optionally, the MME supports group paging of the UE(s) prior to initiating broadcast requests towards the eNB(s). The group paging can serve as an indication that it should listen to the broadcast channel and also provide broadcast schedule information. This is beneficial to avoid other UE(s) in the broadcast area, i.e. UE(s) that are in the cell but not part of the group, from listening to the broadcast channel/message, thereby avoid disturbing other UE(s) and saving battery life.

Figure 12:
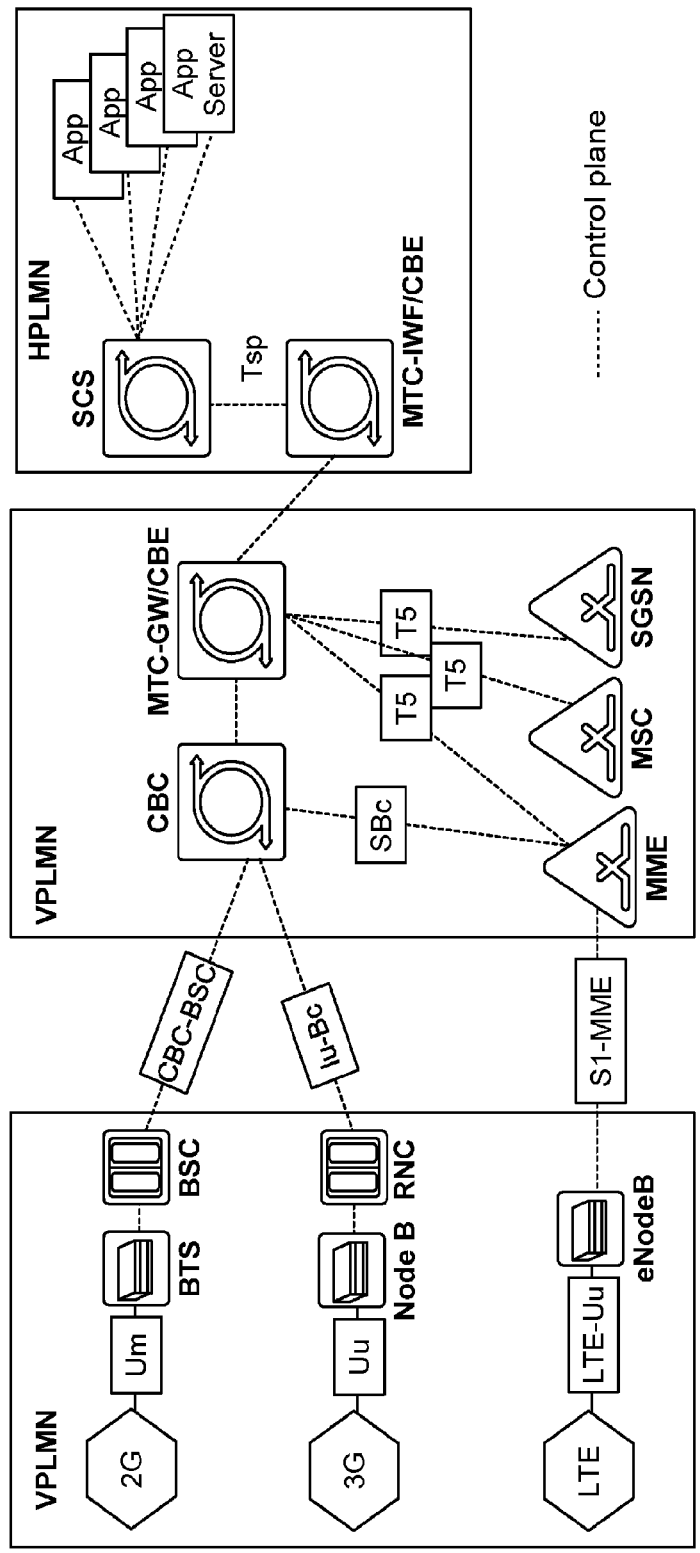
FIG. 12 shows a group messaging architecture according to a fifth implementation example of the invention.

Fifth Implementation Example: MTC-IWF Interconnects with MTC-GW/CBE in VPLMN or IWF Acts as CBE In this variant the SCS uses the interface Tsp to provide the group message content and location area information to the IWF. IWF acts as CBE in non-roaming case. In roaming case IWF sends the group message request via a dedicated interface to a gateway entity in the VPLMN called MTC-GW that acts as a CBE towards the CBC in VPLMN. Alternatively, the IWF itself can act as CBE also in roaming cases and interconnects directly with the CBC in VPLMN (if VPLMN allows for this) or via a MTC-GW. All alternatives are depicted in FIG. 12. The MTC-GW/CBE interfaces to the MME, MSC, SGSN via T5 interfaces illustrated in FIG. 2 between the MTC-IWF and the MME, MSC and SGSN. The remaining components shown in FIG. 12 are similar to those illustrated in FIG. 10 or 11.

Figure 13:
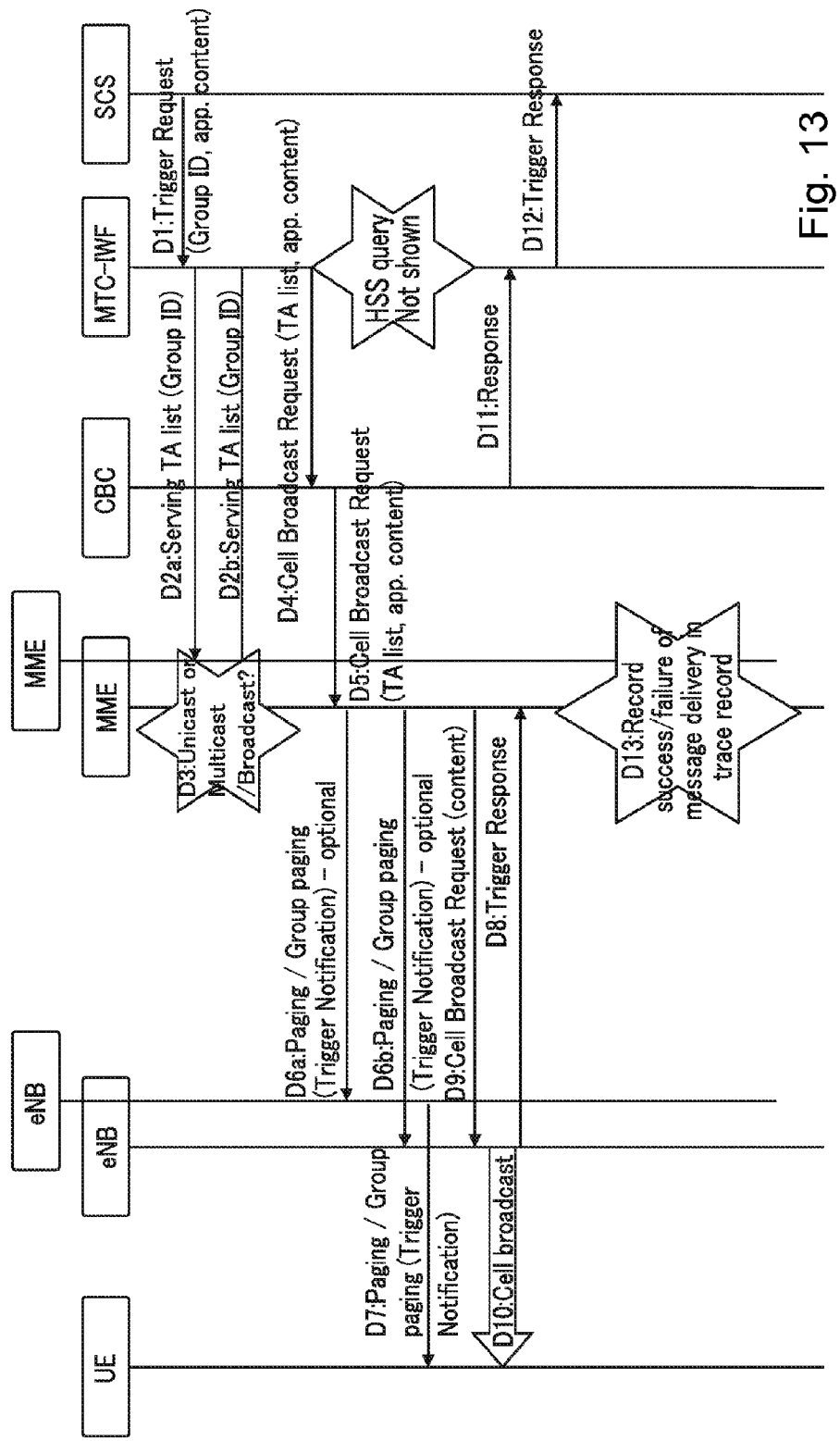
FIG. 13 shows a group messaging signaling flow according to the fifth implementation example.

FIG. 13 illustrates a group messaging signaling flow according to the fifth implementation example.

Following functions are required according to the fifth implementation example.

MTC-IWF/CBE and MTC-GW/CBE:

In general, according to an embodiment of the invention, the operations of the processing block 10 and the communication block 20 are performed by the MME, and the communication block 20 comprises receiving a trigger request (step D1) including at least the group identification, the application layer content via the inter-domain control plane interface, e.g. Tsp, the location area information or geographical area information (e.g. TA list/Cell ID list) (optional) for the group message according to a cell broadcasting service (CBS). Upon receiving the trigger request, the MTC-IWF/MTC-GW identifies serving nodes for requesting cell broadcasting for the group message according to the cell broadcasting service, based on the group identification and/or the location area information. The MTC-IWF/MTC-GW includes at least an identification for group messaging and the application layer content in a cell broadcast request, and sends (step D4) the cell broadcast request towards a cell broadcast center of the cell broadcasting service to initiate trigger delivery. The MTC-IWF may send the cell broadcast request via a dedicated interface to a gateway (MTC-GW) acting as cell broadcast entity towards the cell broadcast center.

In particular, the MTC-IWF/MTC-GW supports CBE functionality. It maps Group ID/location area to serving nodes and to TA/RA/LA/Cell ID lists.

The MTC-IWF/MTC-GW interfaces with MME/SGSN/MSC to obtain TA/RA/LA/Cell ID lists (steps D2a, D2b). Optionally, the MTC-IWF/MTC-GW maps location information to a CB service area. The MTC-IWF/MTC-GW includes a special indication (e.g. Group ID) for group messaging so that the MME/BSC/RNC can differentiate group messages from warning message delivery. The MTC-IWF/MTC-GW interfaces with CBC to initiate trigger delivery (step D4).

CBC:

In general, according to an embodiment of the invention, the operations of the processing block 10 and the communication block 20 are performed by the MME, and the communication block 20 comprises receiving a cell broadcast request including at least the group identification and the application layer content via the inter-domain control plane interface, for the group message according to a cell broadcasting service. Upon receiving the cell broadcast request, the CBC includes at least the application layer content and an identification for group messaging based on the group identification in a cell broadcast start request for starting cell broadcast, and sends (step D5) the cell broadcast start request to serving nodes for the plurality of devices based on information included in the cell broadcast request.

In particular, the CBC uses existing protocols on CBC-BSC, Iu-Bc and SBc to send (step D5) the group message to MME/BSC/RNC taking into account the CB service area or TA/RA/LA/Cell ID lists. The CBC forwards a special indication (e.g. Group ID) for group messaging received from the MTC-IWF/CBE or MTC-GW/CBE to the MME/RNC/BSC in the cell broadcast start request (step D5).

MME/SGSN/MSC:

In general, according to an embodiment of the invention, the operations of the processing block 10 and the communication block 20 are performed by the MME, and the communication block 20 comprises receiving a cell broadcast start request including at least an identification for group messaging and the application layer content, and forwarding (step D8) the cell broadcast start request including the application layer content to access nodes via which the plurality of devices access the communication network, for initiating cell broadcast.

In particular, the MME/SGSN/MSC may provide TA/RA/LA/Cell ID lists to IWF/CBE or MTC-GW/CBE (in response to steps D2a, D2b). The MME/SGSN/MSC receives a special indication (e.g. Group ID) for group messaging from the CBC (step D5).

Optionally, the MME/SGSN/MSC supports group paging of UE(s) prior to initiating broadcast request towards the eNB(s) (steps D6a, D6b, D7). The group paging can serve as an indication that the UE(s) should listen to the broadcast channel and also provide broadcast schedule information. This is beneficial to avoid other UE(s), i.e. UE(s) that are in the cell but not part of the group, from listening to the broadcast channel/message, thereby avoiding disturbing other UE(s) in the broadcast area and saving energy. A trigger response is sent from the eNB to the MME/SGSN/MSC in step D8.

In step D3, the MME/SGSN/MSC may decide on unicast or multicast/broadcast as described above in the first to third implementation examples.

In step D9 the MME/SGSN/MSC sends a cell broadcast request (cell broadcast start request) to the eNB including the application layer content.

In step D10 the message content is broadcasted in a cell broadcast according to CBS.

In step D11 the CBC sends a response to the cell broadcast request in step D4.

In step D12 the MTC-IWF sends a trigger response to the SCS.

In step D13 the MME/SGSN/MSC may record success/failure of message delivery in a trace record.

Advantages of the Described Solutions Are:
  Maximum re-use of existing MTC and MBMS/CBS architectures.
  New functionality is mainly required for new entities like the MTC-IWF, not for existing legacy entities like MME, MBMS GW and CBC.
  The architectural requirements for group messaging as listed above are fulfilled.
  The solutions are applicable for MTC group messaging but the architecture in general, providing MME addresses and MBMS SAI from IWF to MBMS GW, may be useful in other scenarios like LTE public safety as well.

Similar architectures and functionalities can be applied for GERAN/UTRAN.

Optimizations and functionalities introduced for the first implementation example may also be re-used for public safety group communication.

Figure 14:
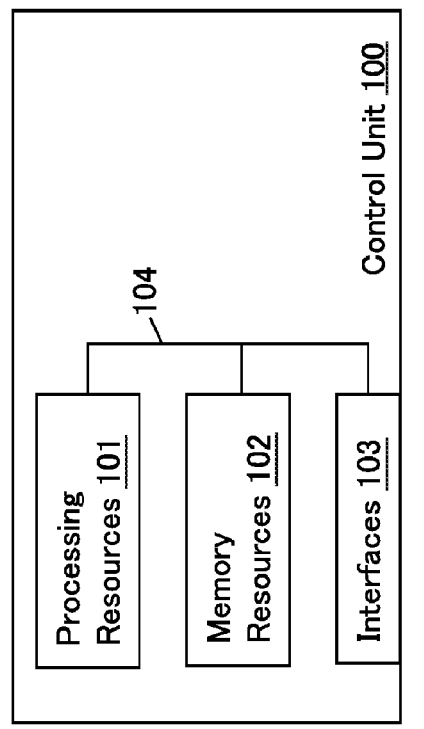
FIG. 14 shows a schematic block diagram illustrating a configuration of a control unit in which examples of embodiments of the invention are implementable.

Now reference is made to FIG. 14 for illustrating a simplified block diagram of a control unit 100 that is suitable for use in practicing the embodiments and implementation example of this invention.

The control unit 100 comprises processing resources 101, memory resources 102 and interfaces 103 which are connected via a link 104. The memory resources 102 may store a program.

The control unit 100 may be part of or used by the respective entities of the first to fifth implementation examples. The control unit 100 may also be part of or used by the processing block 10 and/or the communication block 20.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The program stored in the memory resources 102 is assumed to include program instructions that, when executed by the processing resources, enable the control unit to operate in accordance with the exemplary embodiments of this invention, as detailed above. In general, the embodiments and implementation examples of this invention may be implemented by computer software stored in the memory resources 102 and executable by the processing resources, or by hardware, or by a combination of software and/or firmware and hardware.

The memory resources 102 may be of any type suitable to the local technical environment and may be implemented using any suitable data storage technology, such as semiconductor-based memory devices, magnetic memory devices and systems, optical memory devices and systems, fixed memory and removable memory. The processing resources 101 may be of any type suitable to the local technical environment, and may include one or more of general purpose computers, special purpose computers, microprocessors, digital signal processors (DSPs) and processors based on a multi-core processor architecture, as non-limiting examples.

According to an aspect of the invention, an apparatus of a communication network, which may comprise or use the control unit 100, comprises means for performing processing for a group message to be sent to a plurality of devices, the group message including an application layer content and a group identification identifying the plurality of devices, and means for performing communication for sending the group message to the plurality of devices by using a protocol for enabling sending the group message in broadcast data to the plurality of devices.

The protocol may enable sending the group message in multimedia broadcast/multicast service data or cell broadcast service data to the plurality of devices.

At least the application layer content and group identification of the group message may be communicated via an inter-domain control plane interface.

The group message may further include information on a location area and/or a radio access technology in which the group message is to be distributed.

The apparatus may comprise an SCS, and may comprise, for performing the communication, means for sending a group message trigger request including at least the group identification and the application layer content via the inter-domain control plane interface for triggering a session start request for the group message according to a multimedia broadcast/multicast service.

The apparatus may comprise an IWF, and may comprise, for performing the communication, means for receiving a group message trigger request including at least the group identification and the application layer content via the inter-domain control plane interface for triggering a session start request for the group message according to a multimedia broadcast/multicast service, and means for, upon receiving the group message trigger request, obtaining serving node addresses and international mobile subscriber identities for the plurality of devices, means for including the group identification, the application layer content and serving node addresses in a session request, and means for sending the session request via at least one dedicated interface.

The at least one dedicated interface may be an interface between the IWF for machine type communication and a broadcast/multicast service centre.

The apparatus may further comprise at least one of the following: means for authorizing/authenticating the group message trigger request for the group identification, means for generating charging records for requests received via the inter-domain control plane interface, means for translating the location area to areas according to the multimedia broadcast/multicast service, means for deciding to send the group message to the plurality of devices in a unicast mode or broadcast/multicast mode based on at least one of information on how many of the plurality of devices are actually attached to the communication network, size of the message, serving node capabilities, UE capabilities, UE's current location information, means for authorizing multimedia broadcast/multicast services in case the broadcast/multicast mode is decided, and means for including the areas according to the multimedia broadcast/multicast service in the session request and/or an address of a multimedia broadcast/multicast service gateway.

The apparatus may comprise an HSS, and may comprise, for performing the processing, means for providing user subscription information based on the group identification, and optionally means for providing an address of a gateway according to a multimedia broadcast/multicast service, serving node addresses and/or capabilities based on the group identification and/or the location area and/or a multimedia broadcast/multicast service area.

The apparatus may comprise an H-BMSC, and may comprise, for performing the communication, means for, depending on a domain of serving nodes for the plurality of devices, forwarding a session request for the group message according to a multimedia broadcast/multicast service via a dedicated control plane interface or a user plane interface from a home network to a visited network, and means for providing the application layer content via the dedicated control plane interface or the user plane interface from the home network to the visited network, or means for selecting a multimedia broadcast/multicast service gateway for performing broadcast and/or a radio access technology based on the group message and sending a session request for the group message to the selected multimedia broadcast/multicast service gateway, means for retrieving serving node address for the group of devices depending on where they are currently registered, means for sending the session request including information on the serving node address and/or multimedia broadcast/multicast service area information.

The apparatus may comprise a V-BMSC, and may comprise, for performing the communication, means for authenticating/authorizing a session request for the group message according to a multimedia broadcast/multicast service, means for receiving the application layer content via a dedicated control plane interface or a user plane interface from a home network, means for selecting a multimedia broadcast/multicast service gateway for performing broadcast and/or a radio access technology based on the group message and sending a session request for the group message to the selected multimedia broadcast/multicast service gateway, means for retrieving a serving node address for the group of devices depending on where they are currently registered, and means for sending the session request including information on the serving node address and/or multimedia broadcast/multicast service area information.

The apparatus may further comprise means for retrieving the application layer content from the group message and storing it.

The apparatus may comprise an MBMS GW, and may comprise, for performing the communication, means for determining serving nodes from serving node address information included in a session request and/or multimedia broadcast/multicast service area information included in the session request and/or by querying a home subscription server, means for sending a session start request to the determined serving nodes to establish a multimedia broadcast/multicast service session, and means for providing the application layer content via IP multicast to base stations which join the multimedia broadcast/multicast service session.

The apparatus may comprise an SCS and/or BMSC, and may comprise, for performing the communication, means for receiving the application layer content and the group identification from an application server, means for authenticating/authorizing a session request for the group message according to a multimedia broadcast/multicast service, means for including the group identification, serving node address information and multimedia broadcast/multicast service area information in the session request, and means for selecting a multimedia broadcast/multicast service gateway for performing broadcast based on the group identification and the broadcast/multicast service areas and/or a configuration, and sending the session request to the selected multimedia broadcast/multicast service gateway.

The apparatus may further comprise at least one of the following: means for generating charging records for requests received from the application server, means for translating the location area to the multimedia broadcast/multicast service areas, means for deciding sending the group message to the plurality of devices in a unicast mode or broadcast/multicast mode based on information on how many of the plurality of devices are actually attached to the communication network, and means for retrieving the serving node addresses for the plurality of devices from a home subscription server.

The apparatus may comprise an IWF and/or a BMSC, and may comprise, for performing the communication, means for receiving a group message trigger request including at least the group identification and the application layer content via the inter-domain control plane interface for triggering a session start request for the group message according to a multimedia broadcast/multicast service, means for, upon receiving the group message trigger request, obtaining serving node addresses for the plurality of devices, and means for forwarding the group message trigger request to the obtained serving node addresses via a dedicated control plane interface.

The apparatus may further comprise means for translating the location area to areas according to the multimedia broadcast/multicast service, and means for including information on the areas in the group message trigger request.

The apparatus may comprise an MME, and may comprise, for performing the communication, means for receiving a group message trigger request including at least the group identification and the application layer content via a dedicated control plane interface, means for, upon receiving the group message trigger request and determination of need for multicast, selecting a multimedia broadcast/multicast service gateway for performing broadcast based on configuration and load information, and means for sending a session start request to the selected multimedia broadcast/multicast service gateway to establish a multimedia broadcast/multicast service session.

The apparatus may further comprise means for deciding sending the group message to the plurality of devices in a unicast mode or broadcast/multicast mode based on information on how many of the plurality of devices are actually attached to the communication network and/or cells the plurality of devices are camping on.

The apparatus may comprise an MBMS GW, and may comprise, for performing the communication, means for receiving a session start request to establish a multimedia broadcast/multicast service session, and means for responding to the session start request with an IP multicast address.

The apparatus may further comprise means for correlating sessions upon receiving the session start request.

The apparatus may comprise an SCS and/or CBE, and may comprise, for performing the communication, means for sending a cell broadcast request including at least area information, the group identification and the application layer content via the inter-domain control plane interface, for the group message according to a cell broadcasting service.

The apparatus may comprise an IWF and/or CBC, and may comprise, for performing the communication, means for receiving a cell broadcast request including at least area information and the application layer content via the inter-domain control plane interface, for the group message according to a cell broadcasting service, means for, upon receiving the cell broadcast request, identifying serving nodes for requesting start of cell broadcasting, based on the area information and/or radio access technology information, means for including at least an identification for group messaging and the application layer content in a cell broadcast start request, and means for sending the cell broadcast start request to the identified serving nodes or all known serving nodes for requesting start of cell broadcasting.

The apparatus may further comprise at least one of the following: means for authorizing/authenticating the cell broadcast request for the area, means for translating the area to areas according to the cell broadcasting service and including information on the areas in the cell broadcast start request, and means for retrieving addresses of the serving nodes from a home subscription server.

The apparatus may comprise an MME, and may comprise, for performing the communication, means for receiving a cell broadcast start request including at least an identification for group messaging and the application layer content, and means for forwarding the cell broadcast start request including the application layer content to access nodes via which the plurality of devices access the communication network, for initiating cell broadcast.

The apparatus may further comprise means for performing group paging of the plurality of devices prior to sending the cell broadcast start request, and/or means for deciding to send the group message to the plurality of devices in a unicast mode or broadcast/multicast mode based on information on how many of the plurality of devices are actually attached to the communication network.

The apparatus may comprise an IWF and/or CBE and/or an MTC-GW and/or CBE, and may comprise, for performing the communication, means for receiving a trigger request including at least the group identification and the application layer content via the inter-domain control plane interface, for the group message according to a cell broadcasting service, means for, upon receiving the trigger request, identifying serving nodes for requesting cell broadcasting for the group message according to the cell broadcasting service, based on the group identification and/or the location area information, means for including at least an identification for group messaging and the application layer content in a cell broadcast request, and means for sending the cell broadcast request towards a cell broadcast center of the cell broadcasting service to initiate trigger delivery.

The apparatus may further comprise means for sending the cell broadcast request via a dedicated interface to a gateway acting as cell broadcast entity towards the cell broadcast center.

The apparatus may further comprise at least one of the following: means for translating the location area to areas according to the cell broadcasting service and including information on the areas in the cell broadcast request, means for communicating with the identified serving nodes to retrieve information on the cell broadcasting service areas, means for retrieving user subscription information based on the group identification from a home subscription server, and means for retrieving serving node addresses and/or capabilities based on the group identification and/or the location area from the home subscription server.

The apparatus may comprise a CBC, and may comprise, for performing the communication, means for receiving a cell broadcast request including at least the group identification and the application layer content via the inter-domain control plane interface, for the group message according to a cell broadcasting service, means for, upon receiving the cell broadcast request, including at least the application layer content and an identification for group messaging based on the group identification in a cell broadcast start request for starting cell broadcast, and sending the cell broadcast start request to serving nodes for the plurality of devices based on information included in the cell broadcast request.

The apparatus may comprise an MME and/or SGSN and/or MSC, and may comprise, for performing the communication, means for receiving a cell broadcast start request including at least an identification for group messaging and the application layer content, and means for forwarding the cell broadcast start request including the application layer content to access nodes via which the plurality of devices access the communication network, for initiating cell broadcast.

The apparatus may further comprise at least one of the following: means for providing information on cell broadcasting service areas, means for performing group paging of the plurality of devices prior to sending the cell broadcast start request, and means for deciding to send the group message to the plurality of devices in a unicast mode or broadcast/multicast mode based on information on how many of the plurality of devices are actually attached to the communication network.

The above described means may be implemented by the processing resources 101, the memory resources 102 and the interfaces 103.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method for use by an apparatus of a communication network, the method comprising:
   performing processing for a group message to be sent to a plurality of devices, the group message including an application layer content and a group identification identifying the plurality of devices; and
   performing communication for sending the group message to the plurality of devices by using a protocol for enabling sending the group message in broadcast data to the plurality of devices,
   wherein a services capability server sends the group message towards a BMSC entity being a broadcast/multicast service center of the 3GPP Multimedia Broadcast/Multicast Service in order that the BMSC entity can establish a Multimedia Broadcast/Multicast Service session with an mobility management entity being an entity separate from the BMSC entity following which the 3GPP Multimedia Broadcast/Multicast Service is used to send the group message to the plurality of devices in which, a session having been established involving the BMSC entity, the mobility management entity, and a radio access network, the services capability server provides 3GPP Multimedia Broadcast/Multicast Service data so that it is received by a base station entity in the radio access network.

2. The method of claim 1, wherein the protocol enables sending the group message in multimedia broadcast/multicast service data or cell broadcast service data to the plurality of devices.

3. The method of claim 1, wherein at least the application layer content and group identification of the group message are communicated via an inter-domain control plane interface.

4. The method of claim 3, wherein the communication comprises:
   sending a group message trigger request including at least the group identification and the application layer content via the inter-domain control plane interface for triggering a session start request for the group message according to a multimedia broadcast/multicast service.

5. The method of claim 3, the communication comprising:
   receiving a group message trigger request including at least the group identification and the application layer content via the inter-domain control plane interface for triggering a session start request for the group message according to a multimedia broadcast/multicast service;

upon receiving the group message trigger request, obtaining serving node addresses for the plurality of devices; and forwarding the group message trigger request to the obtained serving node addresses via a dedicated control plane interface.

6. The method of claim 5, the communication comprising:

translating the location area to areas according to the multimedia broadcast/multicast service; and including information on the areas in the group message trigger request.

7. The method of claim 3, the communication comprising:

receiving a group message trigger request including at least the group identification and the application layer content via a dedicated control plane interface;

upon receiving the group message trigger request and determination of need for multicast, selecting a multimedia broadcast/multicast service gateway for performing broadcast based on configuration and load information; and sending a session start request to the selected multimedia broadcast/multicast service gateway to establish a multimedia broadcast/multicast service session.

8. The method of claim 7, the communication comprising:

deciding sending the group message to the plurality of devices in a unicast mode or broadcast/multicast mode based on information on how many of the plurality of devices are actually attached to the communication network and/or cells the plurality of devices are camping on.

9. The method of claim 3, the communication comprising:

receiving a session start request to establish a multimedia broadcast/multicast service session; and responding to the session start request with an IP multicast address.

10. The method of claim 9, the communication comprising:

correlating sessions upon receiving the session start request.

11. The method of claim 1, wherein the group message further includes information on a location area and/or a radio access technology in which the group message is to be distributed.

12. The method of claim 1, wherein the processing comprises:

providing user subscription information based on the group identification; and optionally providing an address of a gateway according to a multimedia broadcast/multicast service, serving node addresses and/or capabilities based on the group identification and/or the location area and/or a multimedia broadcast/multicast service area.

13. The method of claim 1, the communication comprising:

depending on a domain of serving nodes for the plurality of devices:

forwarding a session request for the group message according to a multimedia broadcast/multicast service via a dedicated control plane interface or a user plane interface from a home network to a visited network; and providing the application layer content via the dedicated control plane interface or the user plane interface from the home network to the visited network, or selecting a multimedia broadcast/multicast service gateway for performing broadcast and/or a radio access technology based on the group message and sending a session request for the group message to the selected multimedia broadcast/multicast service gateway, retrieving serving node address for the group of devices depending on where they are currently registered, sending the session request including information on the serving node address and/or multimedia broadcast/multicast service area information.

14. The method of claim 1, the communication comprising:

authenticating/authorizing a session request for the group message according to a multimedia broadcast/multicast service;

receiving the application layer content via a dedicated control plane interface or a user plane interface from a home network;

selecting a multimedia broadcast/multicast service gateway for performing broadcast and/or a radio access technology based on the group message and sending a session request for the group message to the selected multimedia broadcast/multicast service gateway;

retrieving serving node address for the group of devices depending on where they are currently registered; and sending the session request including information on the serving node address and/or multimedia broadcast/multicast service area information.

15. The method of claim 14, the communication comprising:

retrieving the application layer content from the group message and storing it.

16. The method of claim 1, the communication comprising:

determining serving nodes from serving node address information included in a session request and/or multimedia broadcast/multicast service area information included in the session request and/or by querying a home subscription server;

sending a session start request to the determined serving nodes to establish a multimedia broadcast/multicast service session; and providing the application layer content via IP multicast to base stations which join the multimedia broadcast/multicast service session.

17. The method of claim 1, the communication comprising:

receiving the application layer content and the group identification from an application server;

authenticating/authorizing a session request for the group message according to a multimedia broadcast/multicast service;

including the group identification, serving node address information and multimedia broadcast/multicast service area information in the session request; and selecting a multimedia broadcast/multicast service gateway for performing broadcast based on the group identification and the broadcast/multicast service areas and/or a configuration, and sending the session request to the selected multimedia broadcast/multicast service gateway.

18. The method of claim 17, the communication comprising at least one of the following actions:

generating charging records for requests received from the application server, translating the location area to the multimedia broadcast/multicast service areas, deciding sending the group message to the plurality of devices in a unicast mode or broadcast/multicast mode based on information on how many of the plurality of devices are actually attached to the communication network, and retrieving the serving node addresses for the plurality of devices from a home subscription server.

19. A method for use by an apparatus of a communication network, the method comprising:

performing processing for a group message to be sent to a plurality of devices, the group message including an application layer content and a group identification identifying the plurality of devices; and performing communication for sending the group message to the plurality of devices by using a protocol for enabling sending the group message in broadcast data to the plurality of devices, wherein at least the application layer content and group identification of the group message are communicated via an inter-domain control plane interface, and wherein the communication includes receiving a group message trigger request including at least the group identification and the application layer content via the inter-domain control plane interface for triggering a session start request for the group message according to a multimedia broadcast/multicast service;

upon receiving the group message trigger request, obtaining serving node addresses and international mobile subscriber identities for the plurality of devices;

including the group identification, the application layer content and serving node addresses in a session request; and sending the session request via at least one dedicated interface.

20. The method of claim 19, wherein the at least one dedicated interface is an interface between an interworking function for machine type communication and a broadcast/multicast service centre.

21. The method of claim 19, the method comprising at least one of the following actions:

authorizing/authenticating the group message trigger request for the group identification, generating charging records for requests received via the inter-domain control plane interface, translating the location area to areas according to the multimedia broadcast/multicast service, deciding to send the group message to the plurality of devices in a unicast mode or broadcast/multicast mode based on at least one of information on how many of the plurality of devices are actually attached to the communication network, size of the message, serving node capabilities, UE capabilities, UE's current location information, authorizing multimedia broadcast/multicast services in case the broadcast/multicast mode is decided, and including the areas according to the multimedia broadcast/multicast service in the session request and/or an address of a multimedia broadcast/multicast service gateway.

22. A computer program product embodied on a non-transitory computer readable medium including a program for a processing device, comprising software code portions for performing the steps of claim 1 when the program is run on the processing device.

23. The computer program product according to claim 22, wherein the program is directly loadable into an internal memory of the processing device.

24. An apparatus of a communication network, the apparatus configured to:

perform processing for a group message to be sent to a plurality of devices, the group message including an application layer content and a group identification identifying the plurality of devices; and perform communication for sending the group message to the plurality of devices by using a protocol for enabling sending the group message in broadcast data to the plurality of devices, wherein a services capability server is configured to send the group message towards a BMSC entity being a broadcast/multicast service center of the 3GPP Multimedia Broadcast/Multicast Service in order that the BMSC entity can establish a Multimedia Broadcast/Multicast Service session with an mobility management entity being an entity separate from the BMSC entity following which the 3GPP Multimedia Broadcast/Multicast Service is used to send the group message to the plurality of devices in which, a session having been established involving the BMSC entity, the mobility management entity, and a radio access network, the services capability server is capable of providing 3GPP Multimedia Broadcast/Multicast Service data so that it is received by a base station entity in the radio access network.

25. The apparatus of claim 24, wherein the protocol enables sending the group message in multimedia broadcast/multicast service data or cell broadcast service data to the plurality of devices.

26. The apparatus of claim 24, wherein at least the application layer content and group identification of the group message are communicated via an inter-domain control plane interface.

27. The apparatus of claim 26, wherein, to perform the communication, the apparatus is configured to:

sending a group message trigger request including at least the group identification and the application layer content via the inter-domain control plane interface for triggering a session start request for the group message according to a multimedia broadcast/multicast service.

28. The apparatus of claim 26, wherein, to perform the communication, the apparatus is configured to:

receive a group message trigger request including at least the group identification and the application layer content via the inter-domain control plane interface for triggering a session start request for the group message according to a multimedia broadcast/multicast service;

upon receipt of the group message trigger request, obtain serving node addresses and international mobile subscriber identities for the plurality of devices;

include the group identification, the application layer content and serving node addresses in a session request; and send the session request via at least one dedicated interface.

29. The apparatus of claim 28, wherein the at least one dedicated interface is an interface between an interworking function for machine type communication and the BMSC entity.

30. The apparatus of claim 28, the apparatus being configured to perform at least one of the following actions:

authorize/authenticate the group message trigger request for the group identification, generate charging records for requests received via the inter-domain control plane interface, translate the location area to areas according to the multimedia broadcast/multicast service, decide to send the group message to the plurality of devices in a unicast mode or broadcast/multicast mode based on at least one of information on how many of the plurality of devices are actually attached to the communication network, size of the message, serving node capabilities, UE capabilities, UE's current location information, authorize multimedia broadcast/multicast services in case the broadcast/multicast mode is decided, and include the areas according to the multimedia broadcast/multicast service in the session request and/or an address of a multimedia broadcast/multicast service gateway.

31. The apparatus of claim 26, wherein, to perform the communication, the apparatus is configured to:

receive a group message trigger request including at least the group identification and the application layer content via the inter-domain control plane interface for triggering a session start request for the group message according to a multimedia broadcast/multicast service;

upon receipt of the group message trigger request, obtain serving node addresses for the plurality of devices; and forward the group message trigger request to the obtained serving node addresses via a dedicated control plane interface.

32. The apparatus of claim 31, wherein, to perform the communication, the apparatus is configured to:

translate the location area to areas according to the multimedia broadcast/multicast service; and include information on the areas in the group message trigger request.

33. The apparatus of claim 26, wherein, to perform the communication, the apparatus is configured to:

receive a group message trigger request including at least the group identification and the application layer content via a dedicated control plane interface;

upon receipt of the group message trigger request and determination of need for multicast, select a multimedia broadcast/multicast service gateway for performing broadcast based on configuration and load information; and send a session start request to the selected multimedia broadcast/multicast service gateway to establish a multimedia broadcast/multicast service session.

34. The apparatus of claim 33, wherein, to perform the communication, the apparatus is configured to:

decide sending the group message to the plurality of devices in a unicast mode or broadcast/multicast mode based on information on how many of the plurality of devices are actually attached to the communication network and/or cells the plurality of devices are camping on.

35. The apparatus of claim 26, wherein, to perform the communication, the apparatus is configured to:

receive a session start request to establish a multimedia broadcast/multicast service session; and respond to the session start request with an IP multicast address.

36. The apparatus of claim 35, wherein, to perform the communication, the apparatus is configured to:

correlate sessions upon receiving the session start request.

37. The apparatus of claim 24, wherein the group message further includes information on a location area and/or a radio access technology in which the group message is to be distributed.

38. The apparatus of claim 24, wherein, to perform the processing, the apparatus is configured to:

provide user subscription information based on the group identification; and optionally provide an address of a gateway according to a multimedia broadcast/multicast service, serving node addresses and/or capabilities based on the group identification and/or the location area and/or a multimedia broadcast/multicast service area.

39. The apparatus of claim 24, wherein, to perform the communication, the apparatus is configured to:

depending on a domain of serving nodes for the plurality of devices:

forward a session request for the group message according to a multimedia broadcast/multicast service via a dedicated control plane interface or a user plane interface from a home network to a visited network; and provide the application layer content via the dedicated control plane interface or the user plane interface from the home network to the visited network, or select a multimedia broadcast/multicast service gateway for performing broadcast and/or a radio access technology based on the group message and sending a session request for the group message to the selected multimedia broadcast/multicast service gateway, retrieve serving node address for the group of devices depending on where they are currently registered, send the session request including information on the serving node address and/or multimedia broadcast/multicast service area information.

40. The apparatus of claim 24, wherein, to perform the communication, the apparatus is configured to:

authenticate/authorize a session request for the group message according to a multimedia broadcast/multicast service;

receive the application layer content via a dedicated control plane interface or a user plane interface from a home network;

select a multimedia broadcast/multicast service gateway for performing broadcast and/or a radio access technology based on the group message and send a session request for the group message to the selected multimedia broadcast/multicast service gateway;

retrieve serving node address for the group of devices depending on where they are currently registered; and send the session request including information on the serving node address and/or multimedia broadcast/multicast service area information.

41. The apparatus of claim 40, wherein, to perform the communication, the apparatus is configured to:

retrieve the application layer content from the group message and store it.

42. The apparatus of claim 24, wherein, to perform the communication, the apparatus is configured to:

determine serving nodes from serving node address information included in a session request and/or multimedia broadcast/multicast service area information included in the session request and/or by querying a home subscription server;

send a session start request to the determined serving nodes to establish a multimedia broadcast/multicast service session; and provide the application layer content via IP multicast to base stations which join the multimedia broadcast/multicast service session.

43. The apparatus of claim 24, wherein, to perform the communication, the apparatus is configured to:

receive the application layer content and the group identification from an application server;

authenticate/authorize a session request for the group message according to a multimedia broadcast/multicast service;

include the group identification, serving node address information and multimedia broadcast/multicast service area information in the session request; and select a multimedia broadcast/multicast service gateway for performing broadcast based on the group identification and the broadcast/multicast service areas and/or a configuration, and send the session request to the selected multimedia broadcast/multicast service gateway.

44. The apparatus of claim 43, wherein, to perform the communication, the apparatus is configured to perform at least one of the following actions:

generate charging records for requests received from the application server, translate the location area to the multimedia broadcast/multicast service areas, decide sending the group message to the plurality of devices in a unicast mode or broadcast/multicast mode based on information on how many of the plurality of devices are actually attached to the communication network, and retrieve the serving node addresses for the plurality of devices from a home subscription server.

* * * * *